US012183153B2

(12) United States Patent
Acres

(10) Patent No.: US 12,183,153 B2
(45) Date of Patent: Dec. 31, 2024

(54) OPTIMIZING DRAWING PRIZE AWARDS

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 273 days.

(21) Appl. No.: 17/694,388

(22) Filed: Mar. 14, 2022

(65) Prior Publication Data

US 2022/0262201 A1 Aug. 18, 2022

Related U.S. Application Data

(63) Continuation of application No. 16/996,323, filed on Aug. 18, 2020, now Pat. No. 11,308,760, which is a continuation of application No. 16/718,470, filed on Dec. 18, 2019, now Pat. No. 10,777,040, which is a continuation of application No. 15/972,443, filed on May 7, 2018, now Pat. No. 10,553,074, which is a continuation of application No. 15/637,012, filed on Jun. 29, 2017, now Pat. No. 9,984,533, which is a continuation of application No. 14/538,597, filed on Nov. 11, 2014, now Pat. No. 9,721,429.

(51) Int. Cl.
*G07F 17/32* (2006.01)

(52) U.S. Cl.
CPC ...... *G07F 17/3244* (2013.01); *G07F 17/3218* (2013.01); *G07F 17/3223* (2013.01); *G07F 17/3225* (2013.01); *G07F 17/3255* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 5,321,241 | A | 6/1994 | Craine |
| 6,089,980 | A | 7/2000 | Gauselmann |
| 6,227,972 | B1 | 5/2001 | Walker et al. |
| 6,910,962 | B2 | 6/2005 | Marks et al. |
| 7,357,713 | B2 | 4/2008 | Marks et al. |

(Continued)

FOREIGN PATENT DOCUMENTS

| | | | | |
|---|---|---|---|---|
| CZ | 14705 U1 | * | 9/2004 | ............. G06F 19/00 |
| GB | 2526141 A | * | 11/2015 | ......... G07F 17/3246 |

(Continued)

OTHER PUBLICATIONS

U.S. Appl. No. 16/156,712, filed Oct. 10, 2018, to Acres.

(Continued)

*Primary Examiner* — Milap Shah
(74) *Attorney, Agent, or Firm* — Ballard Spahr LLP

(57) ABSTRACT

A promotional game is conducted over participants' cell phones. During a play period, a participant advances on a virtual game board using cell phone commands. During the player period drawing entries are generated proportional to play on electronic gaming devices, play of the promotional game, or retail purchases. Some players receive a multiplier for their drawing entries to enhance chances of winning the promotional game. In one embodiment, the multiplier is removed for a player after a cutoff threshold for prizes awarded to that player is reached.

23 Claims, 23 Drawing Sheets

(56) References Cited

U.S. PATENT DOCUMENTS

| | | | | |
|---|---|---|---|---|
| 7,427,233 | B2 | 9/2008 | Walker et al. | |
| 7,604,538 | B2 | 10/2009 | Pacey | |
| 7,766,739 | B2 | 8/2010 | Kane et al. | |
| 7,771,264 | B2 | 8/2010 | Kane et al. | |
| 7,819,747 | B2 | 10/2010 | Kane et al. | |
| 7,918,736 | B2 | 4/2011 | Walker et al. | |
| 7,959,502 | B2 | 6/2011 | Kane et al. | |
| 7,997,978 | B2 | 8/2011 | Kaminkow et al. | |
| 8,025,564 | B2 | 9/2011 | Jackson | |
| 8,029,361 | B2 | 10/2011 | Hardy et al. | |
| 8,057,297 | B2 | 11/2011 | Silvestro | |
| 8,118,667 | B2 | 2/2012 | Herrmann | |
| 8,142,283 | B2 | 3/2012 | Lutnick et al. | |
| 8,181,864 | B1 | 5/2012 | McGhie et al. | |
| 8,246,448 | B2 | 8/2012 | Silvestro | |
| 8,282,491 | B2 | 10/2012 | Auterio et al. | |
| 8,348,764 | B2 | 1/2013 | Cerbini | |
| 8,360,873 | B1 | 1/2013 | Wickett et al. | |
| 8,382,586 | B2 | 2/2013 | Kelly et al. | |
| 8,419,519 | B2 | 4/2013 | Aoki et al. | |
| 8,435,119 | B2 | 5/2013 | Hardy et al. | |
| 8,677,250 | B2 * | 3/2014 | Wormald | G07F 17/3272 715/767 |
| 8,795,058 | B2 | 8/2014 | Wolf | |
| 9,129,476 | B2 | 9/2015 | Hardy et al. | |
| 9,311,769 | B2 * | 4/2016 | LeMay | G06Q 20/322 |
| 9,367,993 | B2 | 6/2016 | Acres | |
| 9,418,510 | B2 | 8/2016 | Baerlocher | |
| 9,553,832 | B2 * | 1/2017 | Blayer | A63F 13/42 |
| 9,600,978 | B2 | 3/2017 | Acres | |
| 9,721,429 | B2 | 8/2017 | Acres | |
| 9,886,817 | B2 | 2/2018 | Acres | |
| 9,984,533 | B2 | 5/2018 | Acres | |
| 10,074,238 | B2 * | 9/2018 | Taylor | G06Q 20/32 |
| 10,121,309 | B2 | 11/2018 | Acres | |
| 10,361,986 | B2 * | 7/2019 | Crocker | H04L 51/10 |
| 10,553,074 | B2 | 2/2020 | Acres | |
| 10,777,040 | B2 | 9/2020 | Acres | |
| 2002/0077173 | A1 | 6/2002 | Luciano et al. | |
| 2003/0003988 | A1 | 1/2003 | Walker et al. | |
| 2003/0060256 | A1 | 3/2003 | Joshi | |
| 2003/0199308 | A1 | 10/2003 | Parker | |
| 2003/0199318 | A1 | 10/2003 | Nassef | |
| 2003/0216966 | A1 | 11/2003 | Saenz et al. | |
| 2004/0014515 | A1 | 1/2004 | Tracy et al. | |
| 2005/0032569 | A1 | 2/2005 | Turk | |
| 2005/0035552 | A1 | 2/2005 | Ibbertson et al. | |
| 2005/0037842 | A1 | 2/2005 | Kastner | |
| 2005/0091108 | A1 | 4/2005 | Frost | |
| 2005/0192078 | A1 * | 9/2005 | Jawaharlal | G07F 17/329 463/40 |
| 2005/0250580 | A1 * | 11/2005 | Bird | A63F 13/792 463/42 |
| 2006/0068876 | A1 | 3/2006 | Kane et al. | |
| 2006/0148559 | A1 | 7/2006 | Jordan et al. | |
| 2006/0178194 | A1 | 8/2006 | Jubinville et al. | |
| 2006/0190321 | A1 * | 8/2006 | Martins Nicho | G06Q 30/02 705/14.14 |
| 2006/0252501 | A1 | 11/2006 | Little et al. | |
| 2007/0060381 | A1 | 3/2007 | Weiss | |
| 2007/0077981 | A1 | 4/2007 | Hungate et al. | |
| 2008/0039173 | A1 | 2/2008 | Walther et al. | |
| 2008/0076542 | A1 | 3/2008 | Iddings et al. | |
| 2008/0102931 | A1 | 5/2008 | Marks | |
| 2008/0108406 | A1 | 5/2008 | Oberberger | |
| 2008/0108424 | A1 | 5/2008 | Baerlocher et al. | |
| 2008/0139306 | A1 | 6/2008 | Lutnick et al. | |
| 2008/0161111 | A1 | 7/2008 | Shuman | |
| 2008/0167106 | A1 | 7/2008 | Utnick et al. | |
| 2008/0254883 | A1 | 10/2008 | Patel et al. | |
| 2009/0005160 | A1 | 1/2009 | Jones et al. | |
| 2009/0055205 | A1 | 2/2009 | Nguyen et al. | |
| 2009/0069074 | A1 | 3/2009 | Silvestro | |
| 2009/0111550 | A1 * | 4/2009 | Freimuth | G07F 17/3276 463/9 |
| 2010/0029376 | A1 | 2/2010 | Hardy et al. | |
| 2010/0062840 | A1 | 3/2010 | Herrmann | |
| 2010/0106612 | A1 * | 4/2010 | Gupta | H04W 4/24 705/50 |
| 2010/0255896 | A1 | 10/2010 | Walther et al. | |
| 2011/0009187 | A1 | 1/2011 | Mastropeitro | |
| 2011/0092267 | A1 | 4/2011 | Hardy et al. | |
| 2011/0151957 | A1 | 6/2011 | Falciglia | |
| 2011/0269521 | A1 | 11/2011 | Walther et al. | |
| 2011/0281642 | A1 | 11/2011 | Hardy et al. | |
| 2011/0287823 | A1 | 11/2011 | Guinn et al. | |
| 2012/0108313 | A1 | 5/2012 | Luciano et al. | |
| 2013/0029745 | A1 | 1/2013 | Kelly et al. | |
| 2013/0053133 | A1 * | 2/2013 | Schueller | G06Q 20/3255 463/25 |
| 2013/0116042 | A1 | 5/2013 | Mosley et al. | |
| 2013/0237314 | A1 | 9/2013 | Cannon et al. | |
| 2013/0252693 | A1 | 9/2013 | Arnone et al. | |
| 2013/0346170 | A1 | 12/2013 | Epstein et al. | |
| 2015/0111636 | A1 * | 4/2015 | Saraf | G07F 17/3234 463/25 |
| 2016/0101349 | A1 | 4/2016 | Saferin | |
| 2016/0133090 | A1 | 5/2016 | Acres | |
| 2016/0284168 | A1 | 9/2016 | Acres | |
| 2017/0301184 | A1 | 10/2017 | Acres | |
| 2018/0130289 | A1 | 5/2018 | Acres | |
| 2018/0253939 | A1 | 9/2018 | Acres | |
| 2019/0005765 | A1 | 1/2019 | Acres | |
| 2019/0043311 | A1 | 10/2019 | Acres | |
| 2019/0325702 | A1 | 10/2019 | Acres | |
| 2020/0126357 | A1 | 4/2020 | Acres | |
| 2020/0380824 | A1 | 12/2020 | Acres | |

FOREIGN PATENT DOCUMENTS

| | | | | |
|---|---|---|---|---|
| WO | WO-02054355 | A1 * | 7/2002 | G07C 15/006 |
| WO | 2010/151904 | A1 | 12/2010 | |
| WO | 2011090746 | A1 | 7/2011 | |
| WO | 2012145393 | A1 | 10/2012 | |
| WO | 2013/020141 | A1 | 2/2013 | |
| WO | 2013/163330 | A1 | 10/2013 | |
| WO | 2014/074271 | A1 | 5/2014 | |

OTHER PUBLICATIONS

U.S. Appl. No. 17/173,790 2021/0217273, filed Feb. 11, 2021 Jul. 15, 2021, John F. Acres (Acres Technology).

U.S. Appl. No. 61/339,187, filed Mar. 1, 2010, "Enriched Game Play Environment (Single and/or Multi-Player) for Casino Applications," 20 pages.

* cited by examiner

"TEXT YOUR LUCK" ARCHITECTURE

ENROLL

PLAY

COUNT

STATUS

PEEK

REVEAL

OPTIMIZING DRAWING PRIZE AWARDS

CROSS REFERENCE TO RELATED APPLICATIONS

This is a continuation of U.S. patent application Ser. No. 16/996,323 filed Aug. 18, 2020, which is a continuation of U.S. patent application Ser. No. 16/718,470 filed Dec. 18, 2019, now U.S. Pat. No. 10,777,040 issued Sep. 15, 2020, which is a continuation of U.S. patent application Ser. No. 15/972,443 filed May 7, 2018, now U.S. Pat. No. 10,553,074 issued Feb. 4, 2020, which is a continuation of U.S. patent application Ser. No. 15/637,012 filed Jun. 29, 2017, now U.S. Pat. No. 9,984,533 issued May 29, 2018, which is a continuation of U.S. patent application Ser. No. 14/538,597 filed Nov. 11, 2014, now U.S. Pat. No. 9,721,429 issued Aug. 1, 2017, all of which are incorporated herein by reference in their entirety.

FIELD OF THE INVENTION

This disclosure relates generally to drawings with participant interaction and more particularly to such drawings in which participants may enter or play remotely via a mobile computing device. It also relates to distributing drawing prize awards in a manner that maximizes incentives for players who will increase gaming play as a result of the prize awards and avoids over-rewarding those players for whom the prize awards will provide little or no incentive to increase play.

BACKGROUND

Casinos use a variety of promotional activities to draw players to play the games on the casino floor. One such promotion is a drawing, which may be open only to members of the player's club for the casino. Doing so provides an incentive to join the players' club and also an easy way to enter participants into the drawing, namely via a kiosk with a card reader that when swiped with a player's card enters that player in an electronically operated drawing. The drawing system communicates with the player tracking system, which allocates electronic tickets to each player based on his or her level of play. As a result, players are motivated to increase play, which enhances the chances of a drawing win, up until the winning tickets are drawn. The winners are announced via video displays when the winning tickets are drawn.

These prior art systems suffer from several disadvantages. First, there are few winners. Second, losers have no involvement. Third, the drama is limited to the live drawing event and results in a few very happy people and a great many unhappy—or at least disinterested—people. As a result of these disadvantages, there is very limited player motivation to enter this type of drawing. Often under 10% of eligible customers enter and of those, fewer than half attend the live drawing. In addition, there is very limited effectiveness in using the drawing to draw in new players, something in which casinos have a vital interest.

In addition, as a result of the random nature of the drawing prize awards, players who are already spending at their maximum level may win one of the prizes. Alternatively, some players play very little and will not increase play in response to receiving a drawing prize award. A third group, however, may be motivated to increase play as a result of receiving a drawing prize award.

DETAILED DESCRIPTION

Figure 1A:
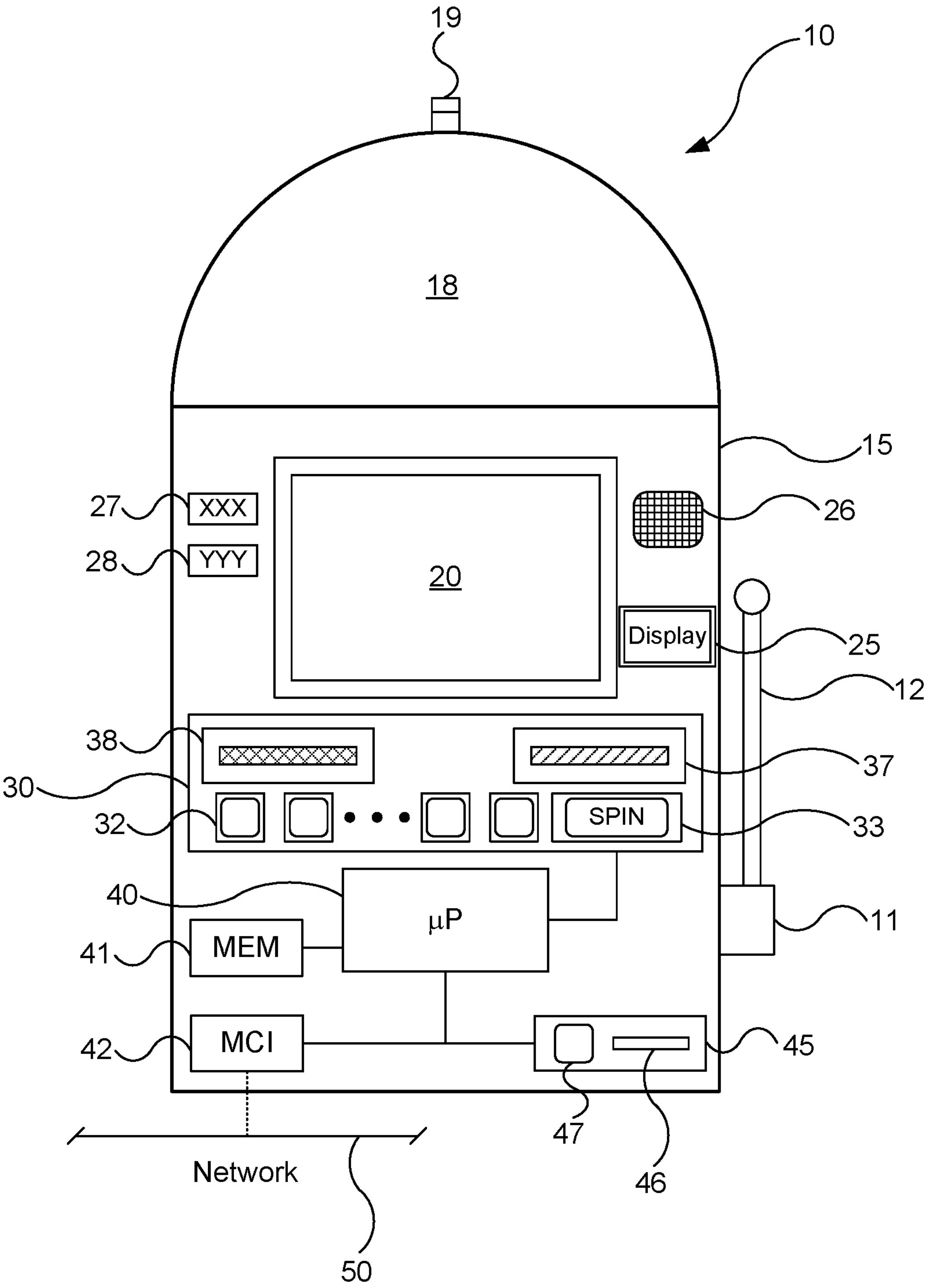
FIG. 1A is a functional block diagram that illustrates a gaming device according to embodiments of the invention.
Figure 1B:
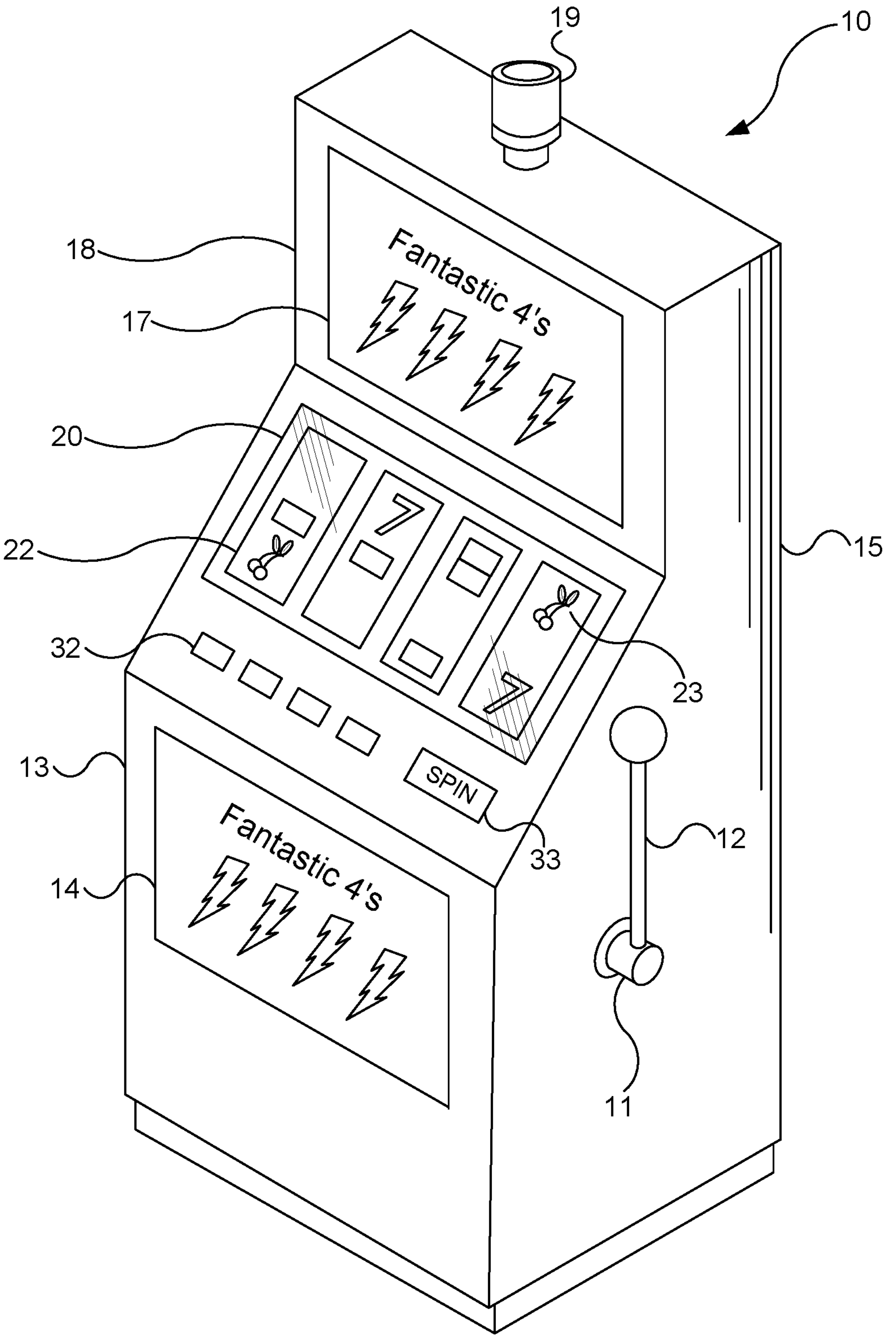
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a “Max Bet” game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a ‘cash-out.’ These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit “attract” sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology’s “service window”. Another example is Las Vegas Gaming Incorporated’s retrofit technology which allows information to be placed over areas of the game or the secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicating with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player’s name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). In other embodiments, stored player points or special 'bonus points' awarded to the player or accumulated and/or stored in a player account may be able to be substituted at or transferred to the gaming device 10 for credits or other value. For example, a player may convert stored loyalty points to credits or transfer funds from his bank account, credit card, casino account or other source of funding. The selected source of funding may be selected by the player at time of transfer, determined by the casino at the time of transfer or occur automatically according to a predefined selection process. One of skill in the art will readily see that this invention is useful with all gambling devices, regardless of the manner in which wager value-input is accomplished.

The credit meter 27 displays the numeric credit value of the money or other value inserted, transferred, or stored dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
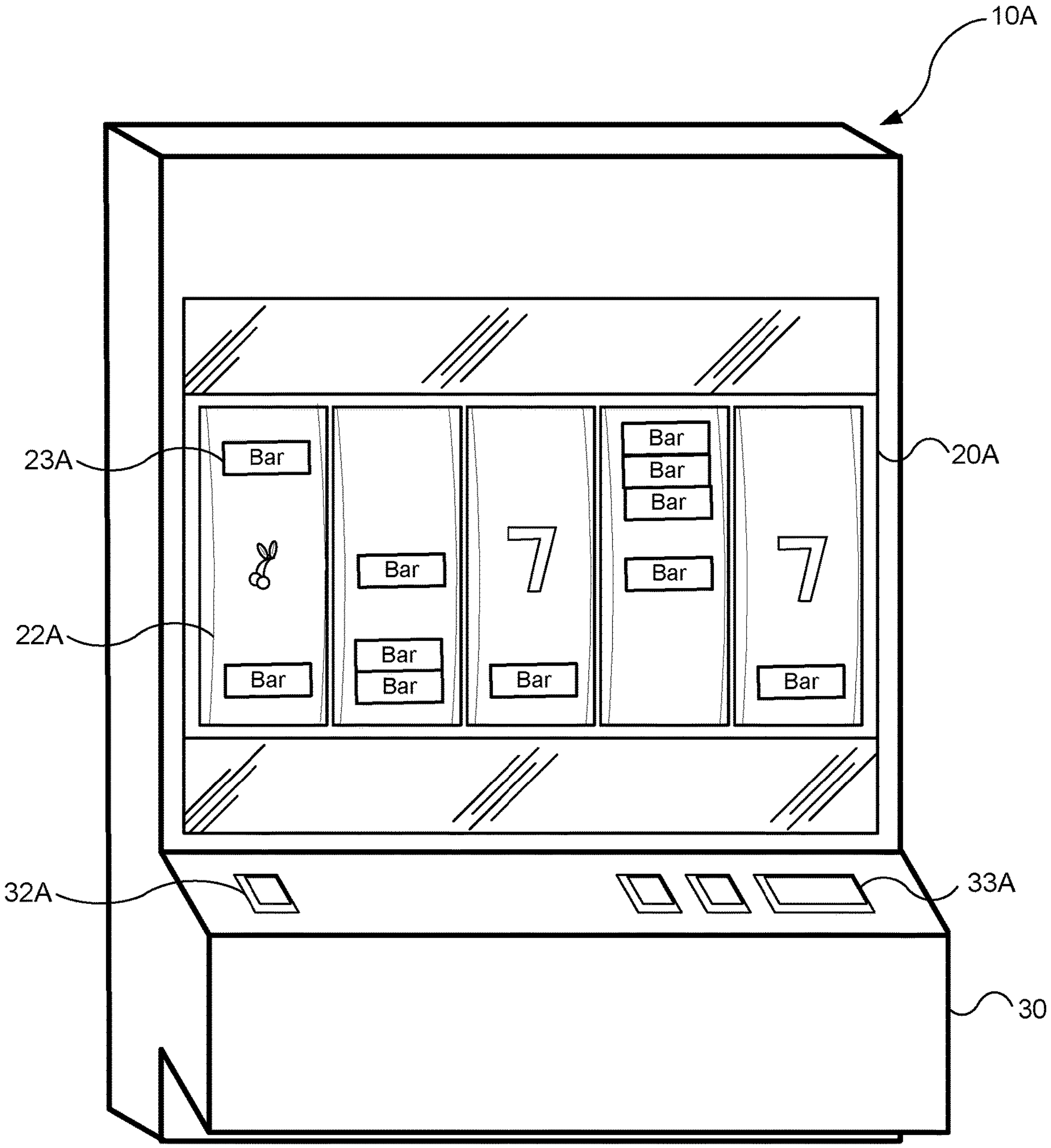
FIGS. 2A, 2B, and 2C are detail diagrams of exemplary types of gaming devices according to embodiments of the invention.
Figure 2B:
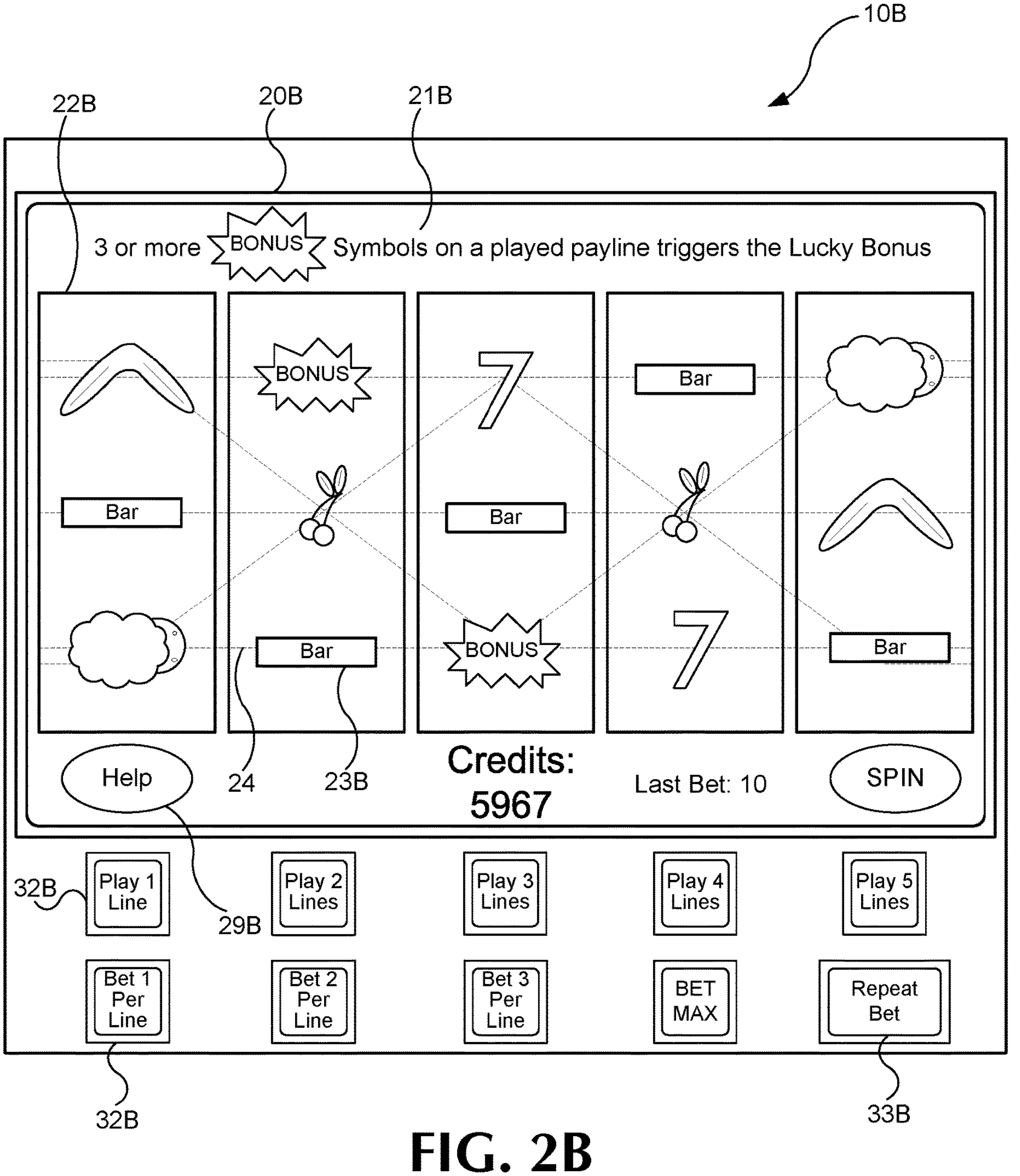
Figure 2C:
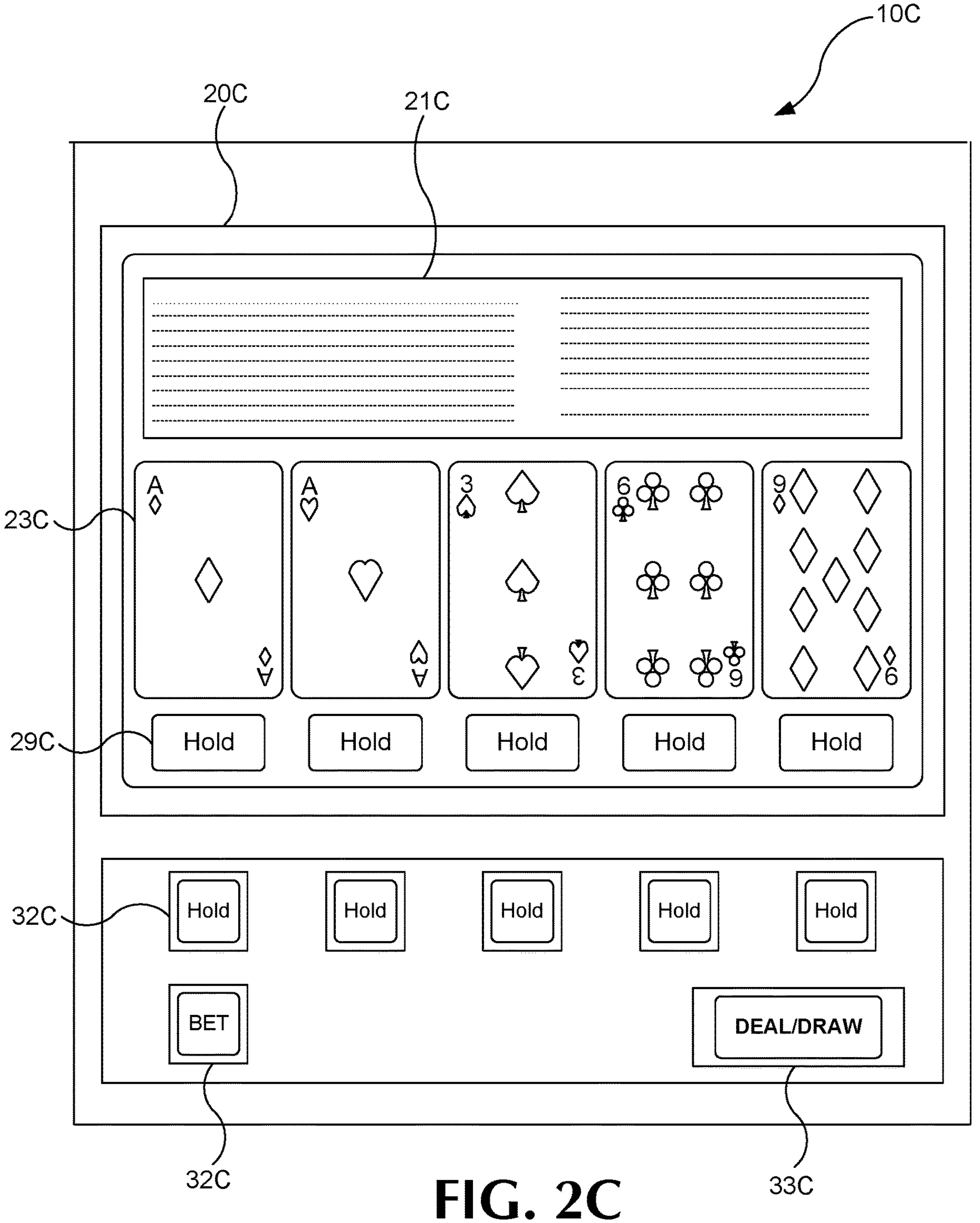

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touchscreen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines and various other types of gaming devices known in the art are contemplated and are within the scope of the invention.

Figure 3:
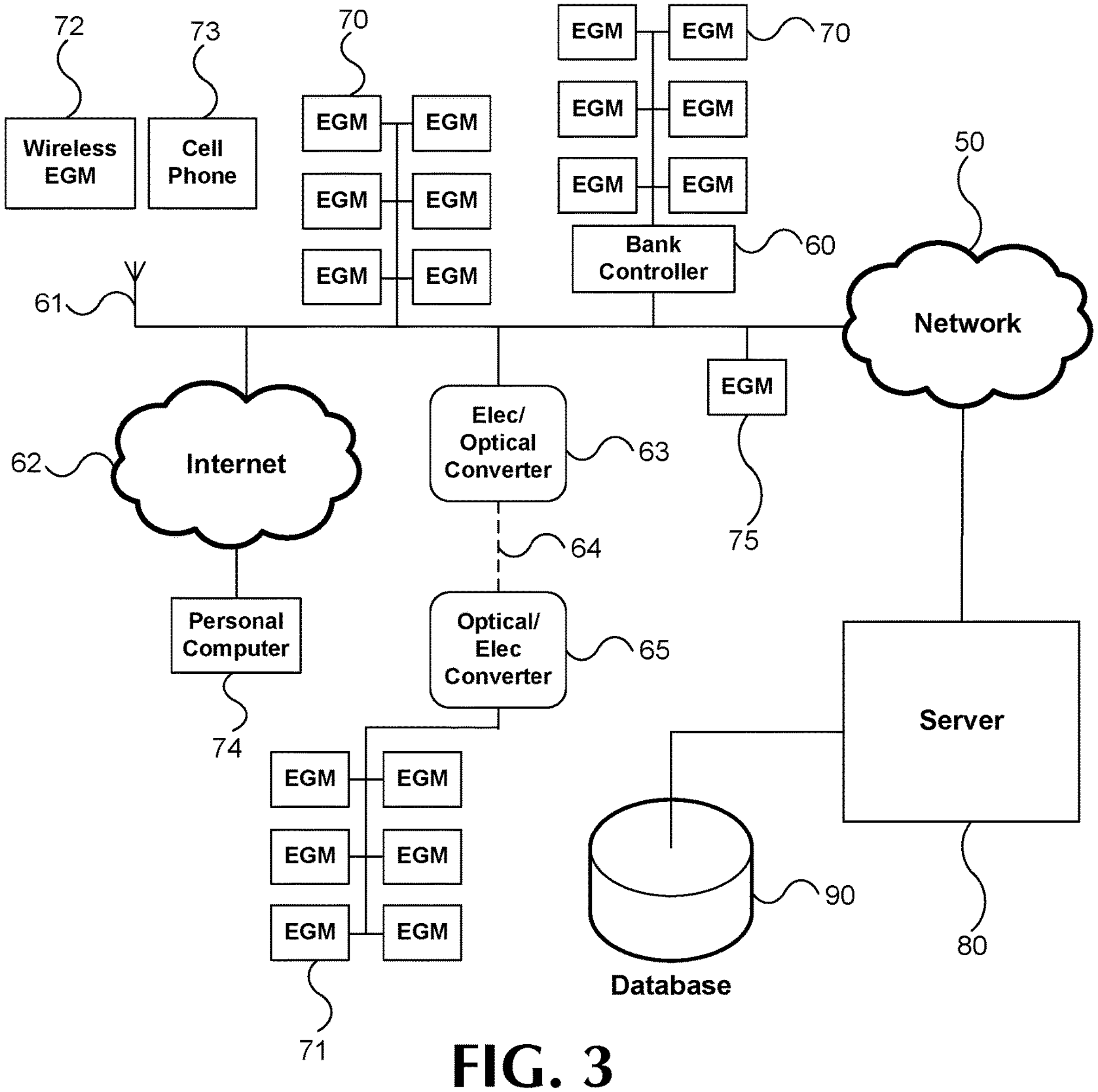
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records in the player database 90 to provide the player with information regarding their player account or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Before referring to the drawings, a brief overview of an embodiment will first be provided. In one aspect, a promotional game is conducted over participants' cell phones. During an enrollment period that overlaps with a period for play of the promotional game, those desiring to play text the word ENROLL to a contest phone number. An automated response text confirms enrollment.

During the play period, a participant advances his or her position on a virtual game board. The board has a predefined number of spaces, e.g., 21 spaces, along which the player moves by texting the word PLAY to the contest phone number. An automated response text confirms the number of spaces advanced as a result of the PLAY command. This particular contest limits such advancement to one opportunity per day.

During the play period, participants' gaming wagering and casino purchases are used to generate one drawing ticket, which in this embodiment is called a winvelope, for each $2 spent by the player. In addition, each time the player texts the word PLAY, he or she is awarded a winvelope. And after the player completes progress along the entire game board, i.e, crosses the finish line, the number of winvelopes allocated to the player increases to one for every dollar spent.

During the course of play each player may text COUNT to receive a text message containing his or her current board position and total winvelopes accumulated. Alternatively, or in addition, he or she may go to the casino, text the word STATUS and have the same information depicted with accompanying animation on a video display.

At the end of the play period each player may text PEEK to receive a message indicating whether or not he or she has won any prizes. To see how many prizes and their worth, however, the player may go to the casino, text the word REVEAL and have the prize details depicted with accompanying animation on the video display.

Figure 4:
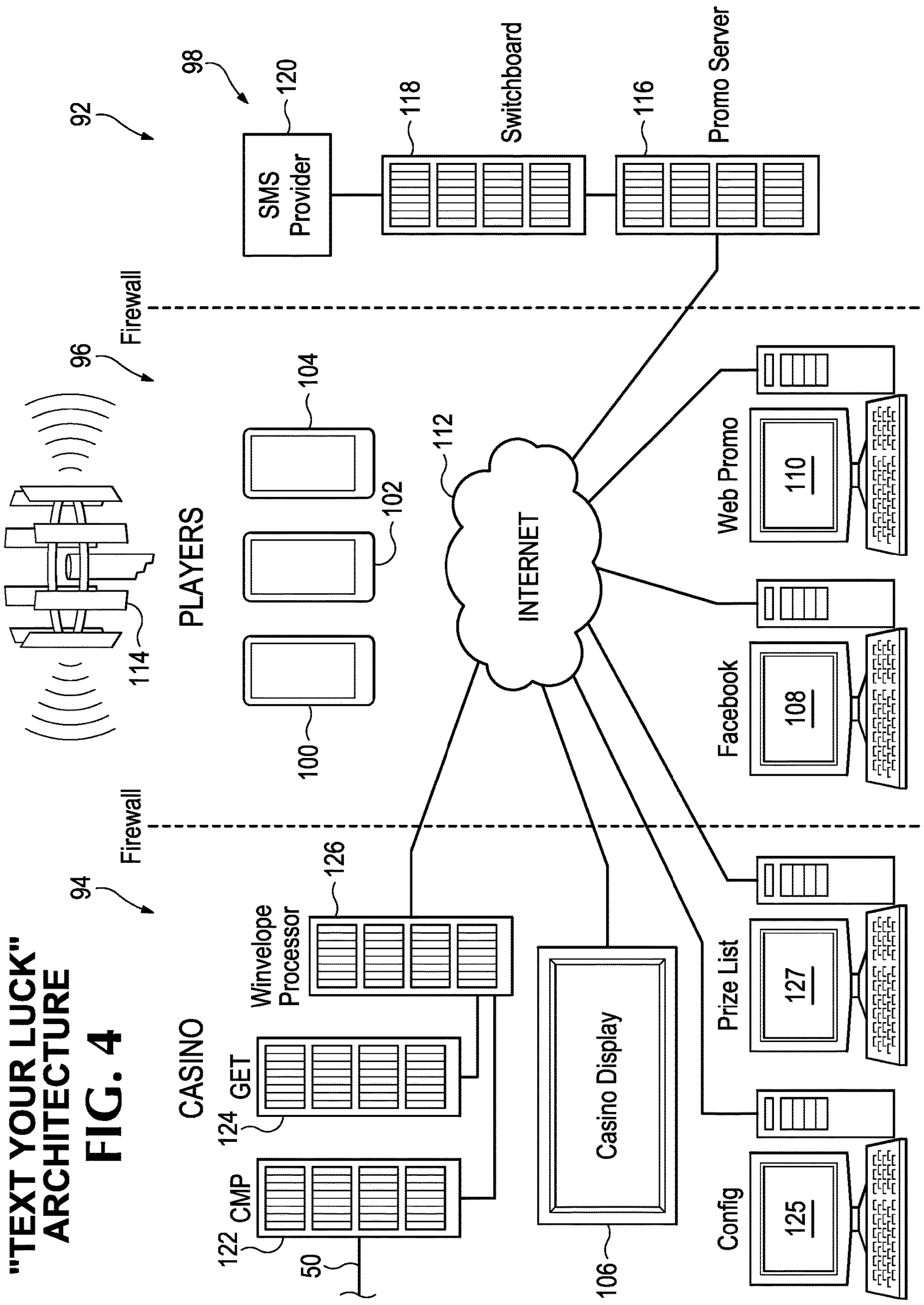
FIG. 4 is a functional diagram of a system according to embodiments of the invention.

Turning now to FIG. 4, consideration will be given to more details of embodiments. Indicated generally at 92 is a promotional gaming system. In the present embodiment, system 92 is shown distributed among 3 groups, namely a casino 94, players 96 of the game, and a third party provider 98 of services that facilitate game play. The players of the game may interact with it using each player's cell phone, like cell phones 100, 102, 104; via a large video display 106 (in this case 70 inches) at the casino; or by players' computing devices 108, 110 connected to social media, such as Facebook, or to a website that provides information about the game.

The components are interconnected via the Internet 112 or by a cellular connection indicated by cell tower 114. The components provided by third-party service provider 98 include a promotional server 116 and a switchboard 118. It should be noted that network computing facilitates distribution of computing devices in a common system in a variety of places and ways. As a result, the computer processes that are described herein may be located anywhere and be distributed among different devices at separate locations—or may be primarily on a single device at one location.

In system 92, promotional server 116 is operated by service provider 98. It includes computer code that implements the rules of the promotion, as will soon be explained, and is the primary point of interaction with players. These interactions may take the form of SMS text messaging via cell phones, like phones 100, 102, 104; Internet interactions via computing devices 108, 110; and via video display 106 at the casino, all of which will be described in connection with the description of the operation of system 92.

Promotional server 116 comprises two servers, a central server and a remote procedure call protocol that is encoded in JSON. These may be run on different virtual machines or on the same one. The central server contains a website that employees of casino 106 or third-party provider 98 may log into for configuring the promotion rules and prize structure and to generate reports. The call-protocol server connects to switchboard 118 to send and receive text messages and to components at casino 94, including video display 106.

Switchboard 118 also implements a server using a remote procedure call protocol encoded in JSON. Switchboard 118 interfaces with a commercial provider 120 of SMS text services. The switchboard handles the details of sending and receiving text messages and logs all such messages in a database. SMS provider 120 receives SMS text messages from players' cell phones, like cell phones 100, 102, 104, which are sent to a phone number associated with the promotional contest. In addition SMS provider 120 sends text messages to players phones in response to rules implemented by and commands from promotional server 116.

In casino 94, a player tracking server 122 and associated database 90 in FIG. 3 collect and store player wagering data from the slot machines on network 50. As a result, server 122 can access data that reflects how much and when each tracked player is wagering. Another server 124 and related database (not shown) track retail spending at the casino for all identified customers. A winvelope server 126 can access servers 122, 124 and retrieve the wagering and spending data. This server tracks the number of winvelopes allocated to each player of the game.

Concluding the description of system 92, workstation computers 125, 127, which can be located anywhere, may be accessed by either casino employees or employees of the third party service provider to configure contest rules or the contest prize structure or to define content displayed to players via the websites or social media pages accessed by computing devices 108, 110. As will be described, they can also be used to enter data that identifies individuals who are eligible to play the game.

Figure 5:
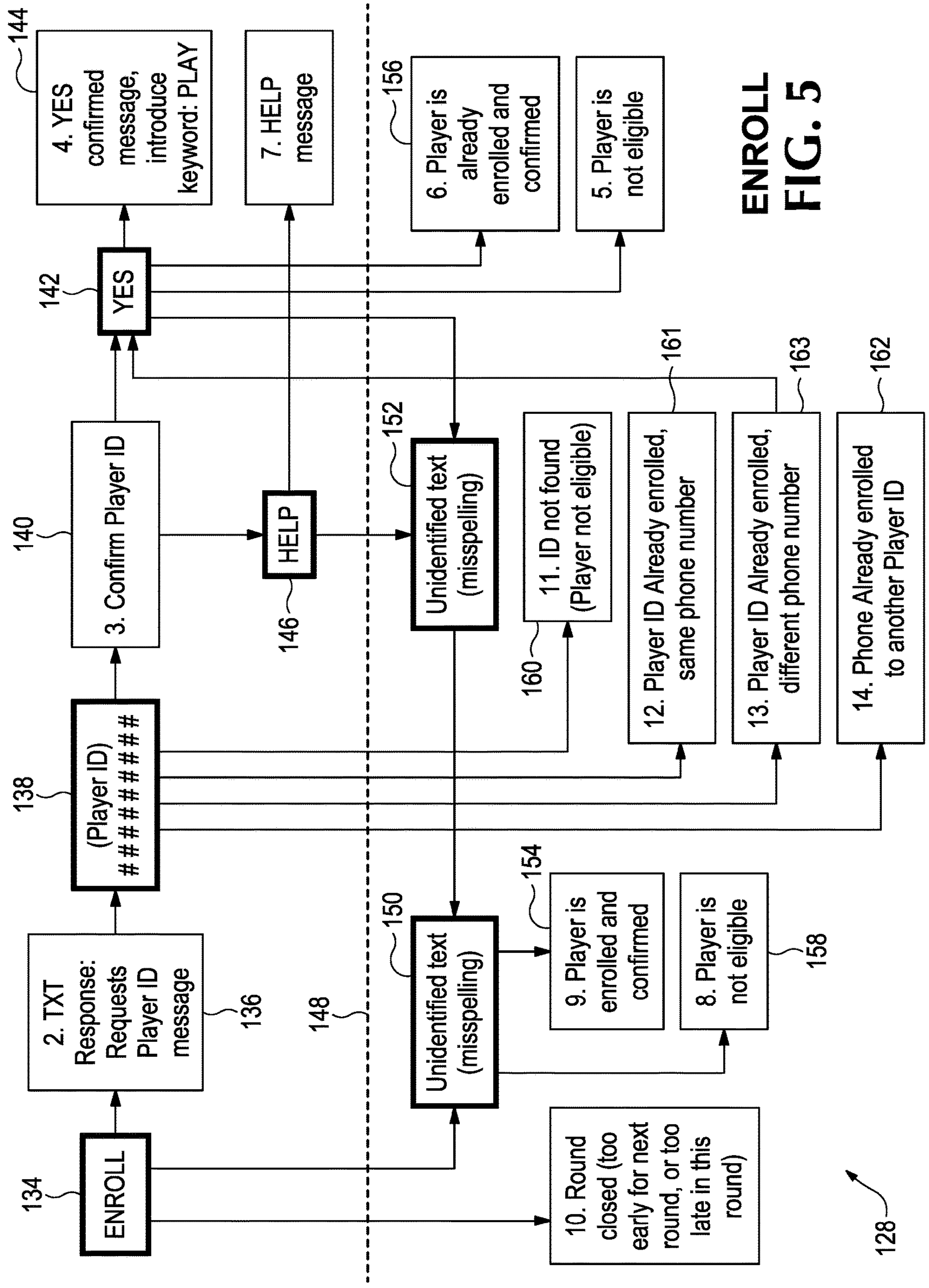
FIGS. 5, 7-9, 11, and 12 are flow charts depicting processes according to embodiments of the invention.

Indicated generally at 128 in FIG. 5 is a flow chart indicating how components of system 92 interact during an enrollment process in which a player enrolls to play a game implemented via the system. Each box that has a bold border signifies either a process step or a text message that appears on a phone display, like the text depicted on a display 130 of cell phone 100 in FIG. 6. The blocks that do not have a bold border each begin with a number and describe a condition that system 92 might encounter during its operation. The number is keyed to a phone text message that system 92 generates in response to the condition described in the box. Each of the possible messages is set forth in the table below and is keyed via the number to a corresponding box in the flow charts depicted in FIGS. 5, 7, 8, 9, 11, and 12, which together describe the text interaction between each player and system 92 and the underlying logic.

| 1 | KEYWORD | TITLE | TEXT COPY |
|---|---|---|---|
| 2 | ENROLL | Request Player ID | Hi! This is Wally. Lets register you to play "Text Your Luck". Please enter your Player ID (from your players club card) to get started. |
| 3 | ENROLL | Confirm Request Player ID | Almost done, please confirm that you are John Smith. Text back YES to confirm your enrollment or HELP if there's a problem. |
| 4 | YES | Confirm Player ID-sent from enrolled but not confirmed player | Thank you for confirming your enrollment. Remember to make your move in the game every day by texting "PLAY". Play slots to earn more winvelopes! |
| 5 | YES | Sent from ineligible player | Hmm. I'm confused. You can text HELP for assistance, or see www.AcmeCasino.com, Facebook or Twitter @TextYourLuck for more details on the game! |
| 6 | YES | Sent from already enrolled and confirmed player | Hmm. I'm confused. You can text HELP for assistance, PLAY to make your daily move, or COUNT to get your current status in the game. -Wally Diamond |
| 7 | HELP | Help Message - same for all | Hi, I'm Wally Diamond host of Text Your Luck. Got a problem? Send me an e-mail to Wally@acres4.com, or www.AcmeCasino.com, Facebook or Twitter @TextYourLuck |
| 8 | UNIDENTIFIED TEXT | Unidentified text & Player not eligible or enrolled | Hmm. I'm confused. You can text HELP for assistance, or see www.AcmeCasino.com, Facebook or Twitter @TextYourLuck for more details on the game! |
| 9 | UNIDENTIFIED TEXT | Unidentified text & Player is enrolled and confirmed during promotional period | Hmm. I'm confused. You can text HELP for assistance, PLAY to do your daily move, COUNT to get your # of winvelopes, or STATUS to see live on the casino screen. |
| 10 | ENROLL, PLAY, PEEK, COUNT | Round is closed (too early or too late to enroll) | The next Open Round of Text Your Luck will begin on Dec 4th. Text me ENROLL then, or see more at www.AcmeCasino.com, Facebook or Twitter @TextYourLuck |
| 11 | ######### (Player ID) | Player ID - ID not found (Player ineligible) | I don't see you on my list. This round is by invitation only. Open play will start Dec 4th. See www.AcmeCasino.com, Facebook or Twitter @TextYourLuck |

-continued

| 1 | KEYWORD | TITLE | TEXT COPY |
|---|---|---|---|
| 12 | ######### (Player ID) | Player ID - ID and phone # already enrolled | You are already enrolled on this phone for this Round of Text Your Luck. Text PLAY to make your daily move, or COUNT to get your current status in the game. |
| 13 | ######### (Player ID) | Player ID - ID enrolled on different phone number | John Smith, you are already enrolled in TYL with a different phone #. Text back YES to add this phone. You can be enrolled on more than one phone. |
| 14 | ######### (Player ID) | Player ID - Phone is already enrolled to another ID. | This phone is already enrolled in Text Your Luck with a different player card. Please text back ENROLL from another phone, or text HELP. |
| 15 | | | |
| 16 | PLAY, COUNT | Promo period over, Player is Enrolled, Confirmed, and Qualified. | Congratulations, you've reached the finish line! Please visit me in the casino to REVEAL your winvelopes or text PEEK & I'll look at what's inside for you. |
| 17 | PLAY, COUNT | Promo period over, Player is Enrolled, Confirmed, and NOT Qualified. | Play for this round of the Text Your Luck is over. You didn't reach the finish line, so you don't qualify to open your winvelopes. Say hey on Facebook, twitter @TextYourLuck, -Wally |
| 18 | PLAY, PEEK, STATUS | Player is not eligible | Wally here. You're not enrolled in this round, and enrollment is closed. Open play will start Dec 4th. See www.AcmeCasino.com, FB or Twitter @TextYourLuck |
| 19 | PLAY | Eligible Player must ENROLL | You're invited to play in this Round, but haven't enrolled in the game show. Act fast and text ENROLL to register, there's only room for 500 players! - Wally |
| 20 | PLAY | Already Moved Today | You have already taken your move on the game board today. 1234 winvelopes are waiting for you. Game position: 15. 12 days left to play. Text me tomorrow! |
| 21 | PLAY | Play, Text response 1 | Welcome to the game! You moved # to game position ##. Prizes may be hidden in Winvelopes, and you just earned 1! See me on Facebook for tips -Wally D. |
| 22 | PLAY | Play, Text response 2 | Awesome, you moved # to game position ##. Your Winvelope count is now ##. Come visit me in the casino and I'll show you your place on the game board! |
| 23 | PLAY | Play, Text response 3 | Each Winvelope is another shot at prizes once you reach the finish line! You moved # to game position ##. Your Winvelope count is ####. Text again tomorrow! |
| 24 | PLAY | Play, Text response 4 | Nice! You moved # to game position ##. Your Winvelope count is ####. There are ## more days to play. Text again tomorrow you're doing great! |
| 25 | PLAY | Play, Text response 5 | You moved # to game position ##. Your Winvelope count is ####. There are ## more days to play. Remember, you open winvelopes at the finish line! |
| 26 | PLAY | Play, Text response 6 | At this rate, you'll hit the finish in no time! You moved # to game position ##. Your Winvelope count is ####. There are ## more days to play. |
| 27 | PLAY | Play, Text response 7 | If you finish early, earn double winvelopes for your slot play. You moved # to game position ##. Your Winvelope count is ####. There are ## more days to play. |
| 28 | PLAY | Play, Text response 8 | Don't stop! You moved # to game position ##. Your Winvelope count is ####. There are ## more days to play. Cash, Bonuscash, and Mystery Prizes could be yours. |
| 29 | PLAY | Play, Text response 9 | #### winvelopes reserved for you. You moved # to game position ##. ## days left to play. Keep going, you're doing great. |
| 30 | PLAY | Play, Text response 10 | Remember, each Winvelope is another shot at prizes at the finish line! You moved # to game position ##. Your Winvelope count is ####. You can do it! |
| 31 | PLAY | Play, Text response 11 | You'll be earning double winvelopes at the finish! You moved # to game position ##. Your Winvelope count is ####. Facebook me for tips. - Wally Diamond |
| 32 | PLAY | Play, Text response 12 | Awesome, you moved # to game position ##. Your Winvelope count is now ##. Can't wait to open those Winvelopes in the casino! |
| 33 | PLAY | Play, Text response 13 | You moved # to game position ##. Your Winvelope count is now ##. Come see me in the casino to see your status on the game board. |
| 34 | PLAY | Play, Text response 14 | Yeah baby! You moved # to game position ##. Your Winvelope count is now ##. Come visit me in the casino and I'll show you your place on the game board! |
| 35 | PLAY | Play, Text response 15 | Don't stop! You moved # to game position ##. Your Winvelope count is ####. There are ## more days to play. Cash, Bonuscash, and Mystery Prizes could be yours. |
| 36 | PLAY | Play, Text response 16 | So close to the finish!!! You moved # to game position ##. Your Winvelope count is ####. There are ## more days to play. -Wally Diamond |
| 37 | | | |

-continued

| 1 | KEYWORD | TITLE | TEXT COPY |
|---|---|---|---|
| 38 | PEEK | PEEK, initial response | I just took a PEEK inside your Winvelopes. Do you want the GOOD news or the BAD news? |
| 39 | GOOD | Qualified player, with prizes | GOOD NEWS, there are prizes waiting for you in your winvelopes! Come to the casino to reveal what's inside and claim what you've won at the Players Club! |
| 40 | BAD | Qualified player, with prizes | There is no BAD NEWS, prizes are waiting for you in your winvelopes! Come to the casino to reveal what's inside and claim what you've won at the Players club! |
| 41 | GOOD | Qualified player, NO prizes | The Good news is you are a finalist! But, I don't see any prizes in your Winvelopes. Join the next Round for more chances at prizes! |
| 42 | BAD | Qualified player, NO prizes | The BAD news is there are no prizes in your winvelopes this Round - but you made it as a finalist! Play next Round for another crack at prizes. -Wally D. |
| 43 | PEEK | Not Qualified to open | You didn't reach the finish line, so you are not eligible to open any winvelopes in this Round. Tips: see www.AcmeCasino.com, FB or Twitter @TextYourLuck |
| 44 | PEEK | Too early to PEEK | It's too early to PEEK at your winvelopes. Hit the finish line, and I'll think about it! (text PEEK after 8am on Oct 22) |
| 45 | | | |
| 46 | REVEAL | Not qualified | see line 43 |
| 47 | REVEAL | Qualified (with or without prizes) | Congrats on reaching the finish line! You're next to be featured on the casino game show! Watch the screen as we REVEAL YOUR WINVELOPES! Or text me PEEK. |
| 48 | REVEAL | Too early to REVEAL | It's too early to REVEAL your winvelopes. Hit the finish line, and I'll show you on the casino big screen! (text REVEAL after 8am on Oct 22) |
| 49 | UNIDENTIFIED TEXT | Unidentified text & Player is enrolled and confirmed and its during promotional period | Hmm. I'm confused. You can text HELP for assistance, PEEK in your winvelopes, or REVEAL see your prizes live on the casino floor Text Your Luck screen. -Wally |
| 50 | | | |
| 51 | STATUS | Enrolled and confirmed player | Congrats on your progress in the game! You're next to be featured on the casino game show! Watch the screen as we see your position! Or text me COUNT for more. |
| 52 | STATUS | Too late Enrolled and confirmed player | It's time to REVEAL your winvelopes if you made the finish line. Thanks for playing Text Your Luck! Text PEEK or REVEAL to check your winvelopes. |
| 53 | STATUS | Not enrolled, too late to enroll | See line 10 |
| 54 | | | |
| 55 | COUNT | Enrolled and confirmed player | Thank you for playing Text Your Luck. I have #### winvelopes reserved for you at the finish line. You moved # to game position ##. ## days left to play. |

The table above refers to three types of prizes: Cash, Bonuscash, and Mystery Prizes. Here the casino operating the promotion is Acme Casino, which uses the term Bonuscash to refer to its non-cashable credits that can be awarded to players. The Mystery Prizes have cash values but are revealed to the players in a manner different from the Cash and Bonuscash prizes, which is described hereinafter in connection with the flow chart in FIG. 12 and the screen shots from an animated sequence in FIGS. 13-17.

Before describing the enrollment process depicted in FIG. 5, consideration will first be given to how a prospective player may learn about and be eligible to enroll. First, system 92 could be configured to accept as players any and all who text the word ENROLL to the contest phone number during a predefined enrollment period. If this is the case, the phone number and instructions to enter by so texting could be distributed widely via mailers, emails, advertising, etc.

But it may be desirable to either track the source of entrants or to limit entrants to a specified class, e.g., members of a particular casino's players' club or to members of subset of that club. This can be done by requiring the player to text a promotional code, e.g., one published in an ad, on a coupon, or in an email, or by requiring the player to text his or her players' club number. In the present case, the promotion is limited to a subset of people who are enrolled in the players' club, which is confirmed in the process depicted in FIG. 5, parts of which are also depicted with the same numeral on phone display 130 in FIG. 6. System 92 stores a list of the subset of eligible players' club members, which may be entered via workstation 125.

In the present case, there is a first round of play, which is limited to a subset of players enrolled in the Acme Casino players' club. The enrollment period is open from October 1-22 and the player period is open from October 1-21. And the period during which prizes can be revealed and redeemed runs from October 22 to October 29. There is another round of play that begins December 24, which is open to all members of the players' club. The second round has similar time periods for enrollment play and the period after play when prizes can be revealed and redeemed. And there is a third round open to all players' club members and anyone a member invites to play the promotional game. In the third round any phone number from which texts are received according to the promotional rules is enrolled to play. In other words, in the third round players need not be a member of the players' club (although joining prior to playing could be made a condition). But a player who is not a member must join the players' club before he or she can redeem any prizes won. This is an effective tool for bringing new players and new players' club members to the casino.

Although the system is set up to generate winvelopes for both retail spending in the casino, which is tracked via server 124 in FIG. 4, the present implementation tracks only wagering via server 126.

Figure 6:
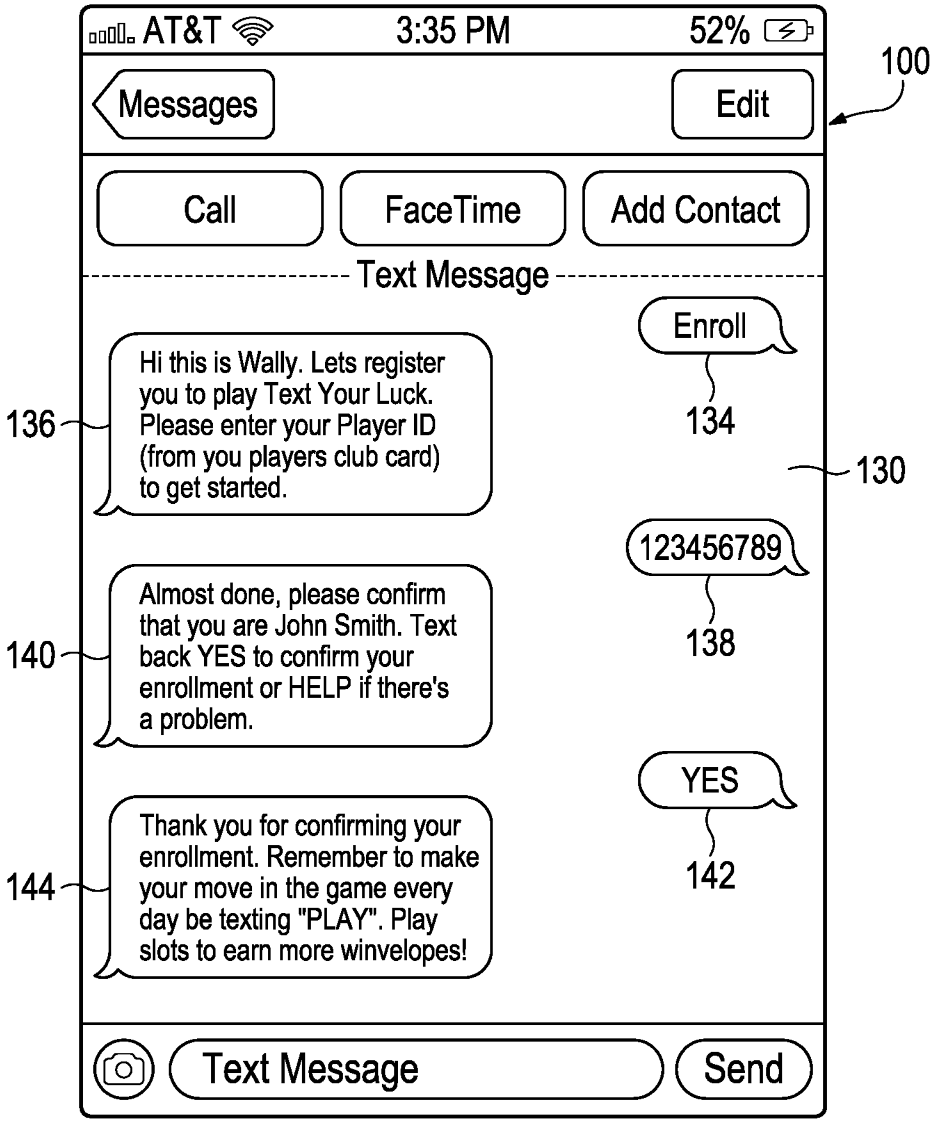
FIG. 6 depicts a cell phone in use according to embodiments of the invention.

At the outset, a prospective player initiates the process by texting ENROLL to the contest phone number as shown in box 134 in FIG. 5 and in the corresponding text bearing the same number on phone display 130 in FIG. 6. Phone display 130 shows text messages in the usual fashion with messages sent from the phone appearing on the right and those received by the phone appearing on the left in sequential order from top to bottom.

Box 136 generates text message 2 (in the table), which is also displayed in FIG. 6. "Wally" in message 2 refers to Wally Diamond, a virtual game show host who interacts with the players via texts and also via an animated display as will soon be described. The player responds to message 2 by texting his or her players' club number in box 138. If the number is in the database and is among the numbers that identify players who are eligible to play (which in the first round includes a predetermined subset that correspond to players' club members who were invited), the system sends text message 3, shown in box 140 and in FIG. 6. The prospective enrollee, if he or she wished to complete the process, responds by texting YES in box 142, also shown in FIG. 6. The system again responds with text message 4 in box 144 and in FIG. 6. Now that the player is enrolled, the system includes their phone number associated with a players' club number in a database of enrolled and confirmed players.

Backtracking to box 140, text message 3 indicates that the player can text HELP in lieu of ENROLL if there is a problem. When a player texts HELP in response (in box 146), system 92 sends text message 7 to the player's phone. The response encourages contact with casino personnel via email or social media.

A dashed line 148 divides an upper process, which was just described, in which everything goes according to plan, i.e., the player does not make any typographical errors, is qualified to enroll to play the game, and texts ENROLL during the enrollment period. In the present case, the period opens at a first time on the day game play starts and extends 10 days into the play period at which time it is cut off because a player enrolled after that time would not be able to complete the game. The math that determines game play, and therefore the maximum length of the enrollment period that will permit a player to finish the game, is described below.

Flow chart 128 coupled with the messages in the table is largely self-explanatory. But a few points are worth mentioning. First, when the player texts to enroll in box 134, to confirm in box 142 or to request help in box 146, he or she may make an error, i.e., send any text that is not one of the keywords, such as a keyword with a typo, depicted in the table. This is shown in boxes 150, 152. The system knows whether the player is enrolled and confirmed because it consults the database of enrolled and confirmed players to check to see if the telephone number from which the text is received is enrolled and confirmed. If so, and depending where the player is in the enrollment process, message 9 in box 154 is generated by the system. If the system does not recognize the phone number and no keywords are texted, e.g., the player attempts to create a keyword but it has a typo, a message as in box 158 is sent to the player. And if the player successfully texts ENROLL but his or her player ID is not among those stored on the system as eligible to participate, a message as in box 160 is sent to the player. And if the player successfully texts ENROLL but is already enrolled, the player receives message 14 in box 162. Boxes 161, 163 describe messages when a player is already enrolled with the same number or already enrolled with a different phone number, respectively. It is possible for a player to have multiple phone numbers associated with his or her player identification number and to play using any of the enrolled phone numbers. Finally, boxes 156, 157 describe responses if an already enrolled or ineligible player simply texts YES.

It should be appreciated that each of the processes reflected in the flowcharts herein can be modified, including the foregoing enrollment process, as needed for rounds two, when all players' club members are eligible, and for round three, when all phones texting to enroll are eligible. Round two will be similar to the first round but the subset is expanded to include all the players' club members. Round three, however, can eliminate the process steps in which eligibility to enroll is checked.

Figure 7:
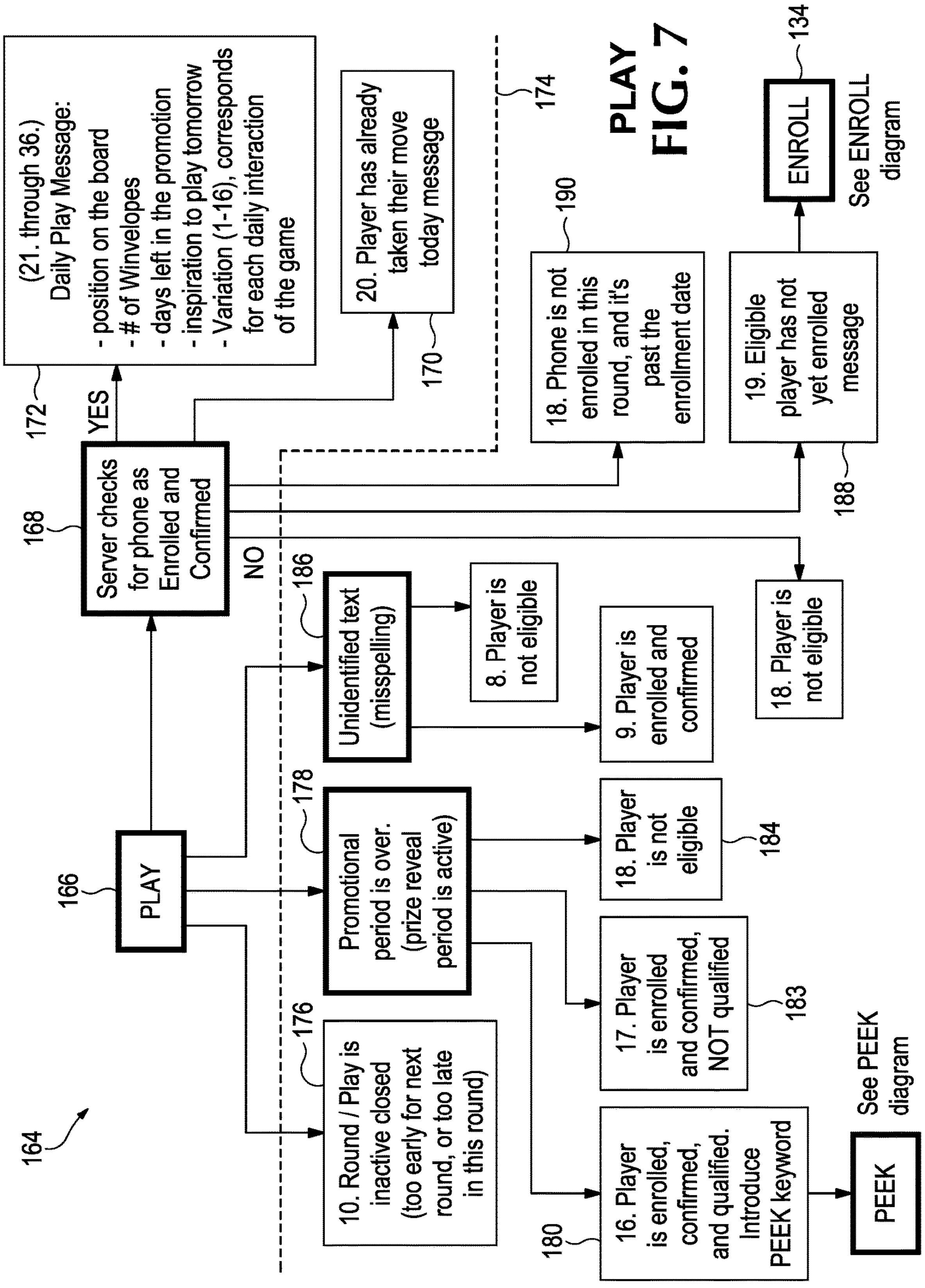

In FIG. 7, a flow chart 164 depicts the play of a player who is successfully enrolled as described in FIG. 5. To play, the player texts the word PLAY to the contest phone number. In response to a successful PLAY command in box 166, system 92 checks, in box 168 to confirm the player is enrolled and confirmed. Because the present implementation limits moves in the game to one per day, if the player has already played that day (by texting PLAY), the system responds with message 20 in box 170. If, on the other hand, the player is eligible to advance, i.e., it is the first time to text PLAY for that day, one of messages 21-36 in box 172 is sent to the player. These messages are sent in sequence each time a successful PLAY command is received. As can be seen by consulting these messages in the table, the text in response to a successful PLAY command informs the player of how many moves along the virtual game board he or she received, his or her current location on the game board, and the number of winvelopes he or she has accrued to date.

The rules for advancing on the game board are that each player must finish in 10-16 days, i.e., text PLAY on 10-16 different days, and each time PLAY is texted the player moves a random number of from 1-3 spaces. These rules could be implemented using a variety of computer algorithms that would be readily apparent to a person having ordinary skill in the art. In the present case, a random number from 10-16 is generated and an array of that size is initialized to all 1s. Starting with the first array entry, the entry is incremented to a maximum of 3 before moving to the next array until the total of all the array entries equals 21, the total number of moves. Each sequential increment will be to 3 until the total is either 21 or would be 22 if the next 1 was incremented to 3. In the latter case the last increment will be to 2. This leaves an array that has either all 3s and 1s or all 3s, one 2, and the remainder 1s, but in all cases having entries that total 21.

Next, a random number from 0 to the total number of 3s is generated. This number determines how many 3s in the matrix might be changed in value. For each 3 that might be changed 0 or 1 is randomly chosen and the result is subtracted from the 3 and added to a 1 in the array. Now the array still adds up to 21 but contains is 2s and 3s. The array is then randomly shuffled using a Knuth/Fisher-Yates random shuffling algorithm. The array of moves, the number of moves already taken, and the last contest day the player moved are all stored as a record in the database. As a result, the players' moves are all predetermined as soon as he or she enrolls. Each player will move 1-3 spaces per PLAY and will finish in 10-16 days. The number of game board spaces advanced with each PLAY and the maximum and minimum number of days to finish can all be set as desired to vary the length or speed of the game using this or a similar algorithm.

The process that was just described, shown above dashed line 174, is when everything goes according to plan, i.e., an enrolled and confirmed player texts PLAY for the first time of the day, does not make any typographical errors, and has texted PLAY during the play period. In the present case, the play period runs for 21 days. As discussed above, each player that texts PLAY daily for the first 16 days of the play period is guaranteed to finish at least by the 16th day and possibly as early as the 10th day.

Below line 174 are processes that depict a variety of conditions that system 92 might encounter. For example, in box 176, if it is after the enrollment end date for the current round and before the enrollment start date of the next round of the game, the system generates message 10 above in response to receipt of the text PLAY. And in box 178 different messages are generated, depending upon player status, when the game play period is over and the time for revealing any prizes won is active—also in response to texting PLAY. If the player is enrolled, confirmed, and qualified, i.e., has moved through all 21 spaces to the finish line, he or she receives message 16 (in box 180) in response to texting PLAY in box 166. The player may then text PEEK in box 182, which generates system responses as will be described in connection with the flow chart of FIG. 11. If the player is enrolled and confirmed but not qualified, i.e., has not crossed the finish line by moving through all 21 spaces, the player receives message 17 in box 183. And if the player is not enrolled nor is he or she eligible to enroll, the player receives message 18 in box 184. The system response for unidentified text in box 186 is similar to that previously described in connection with FIG. 5.

If the game is still in the play period, as previously described the system checks, in box 168, to confirm the player who texted PLAY in box 166 is enrolled and confirmed. If not, one of three messages is generated depending upon whether the enrollment period is still open and whether the player is eligible to enroll. If the player is eligible but has not yet enrolled, message 19 in box 188 is generated; if not, message 18 in box 190 is returned to the player, and the he or she is invited to text ENROLL (in box 134) to begin the process of FIG. 5. An ineligible player receives message 18.

Figure 8:
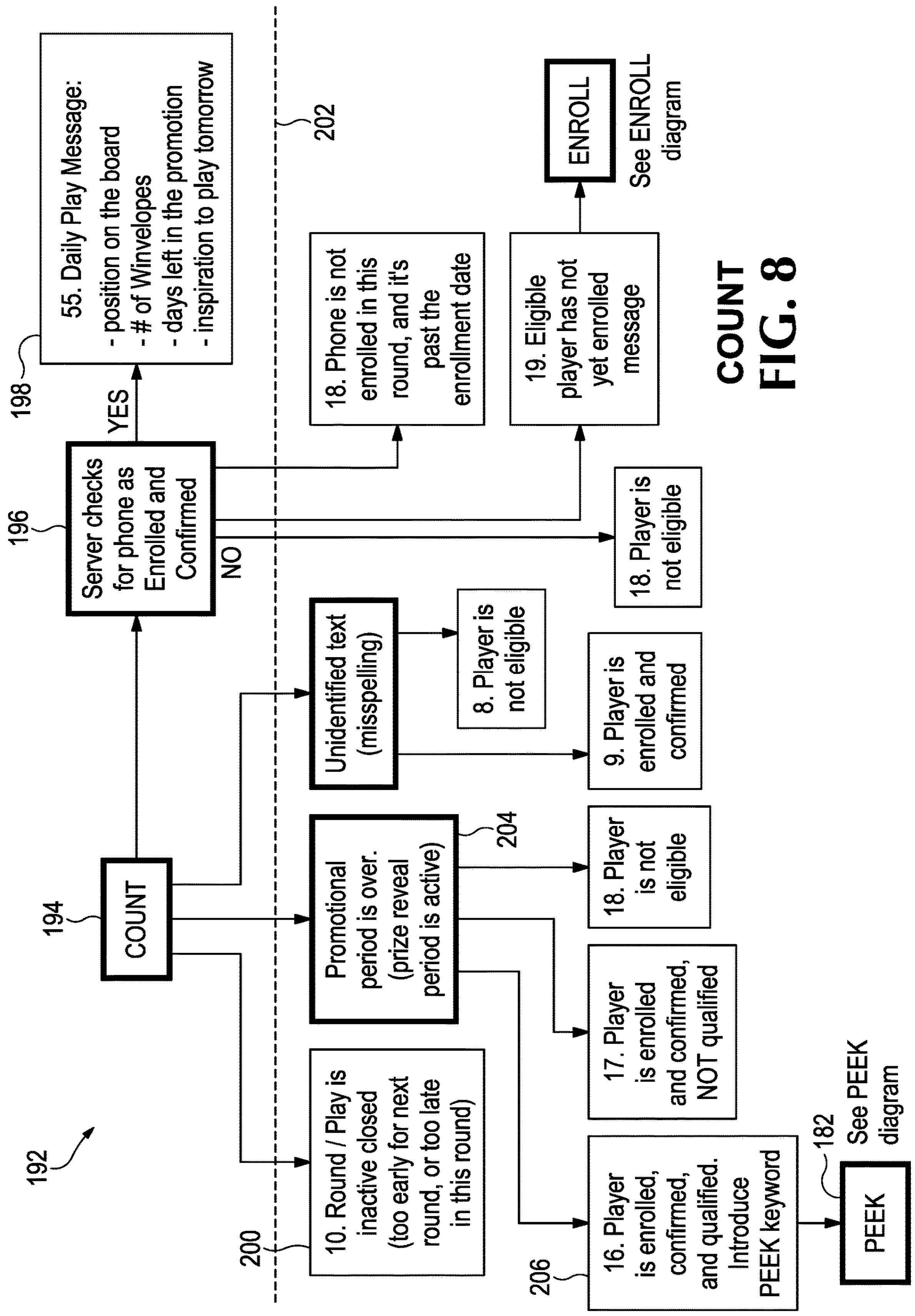

Turning now to FIG. 8, indicated generally at 192 is a flow chart that illustrates a process by which the player can receive a message that informs him or her of the number of winvelopes accrued, the current position on the game board, and the number of days left to play. When the player texts COUNT in box 194, the server checks (in box 196) to confirm that the phone number from which the text is sent is associated with a player who has successfully enrolled and confirmed as described in connection with FIG. 5. If yes, message 55 in box 198 is sent to the player's phone.

If both the time during which the game can be played and the time in which prizes are revealed is passed, message 10 in box 200 is sent. As with the other diagrams, the process that generates the response requested by the command is above a dashed line 202. Most of the boxes below line 202 describe responses that are similar to those described in previous flow charts with one notable exception. If the period for game play, referred to in the flow charts as the promotional period, is over as determined in box 204; the period during which prizes may be revealed is still in effect; and the player is enrolled, confirmed, and qualified, i.e., has crossed the finish line by moving through all 21 spaces, message 16 in box 206 is sent. This informs the player that he or she may text PEEK as depicted in box 182 to learn whether or not the player has won any prizes, but not the nature of the prizes. The PEEK process is described later in connection with the flow chart in FIG. 11.

Figure 9:
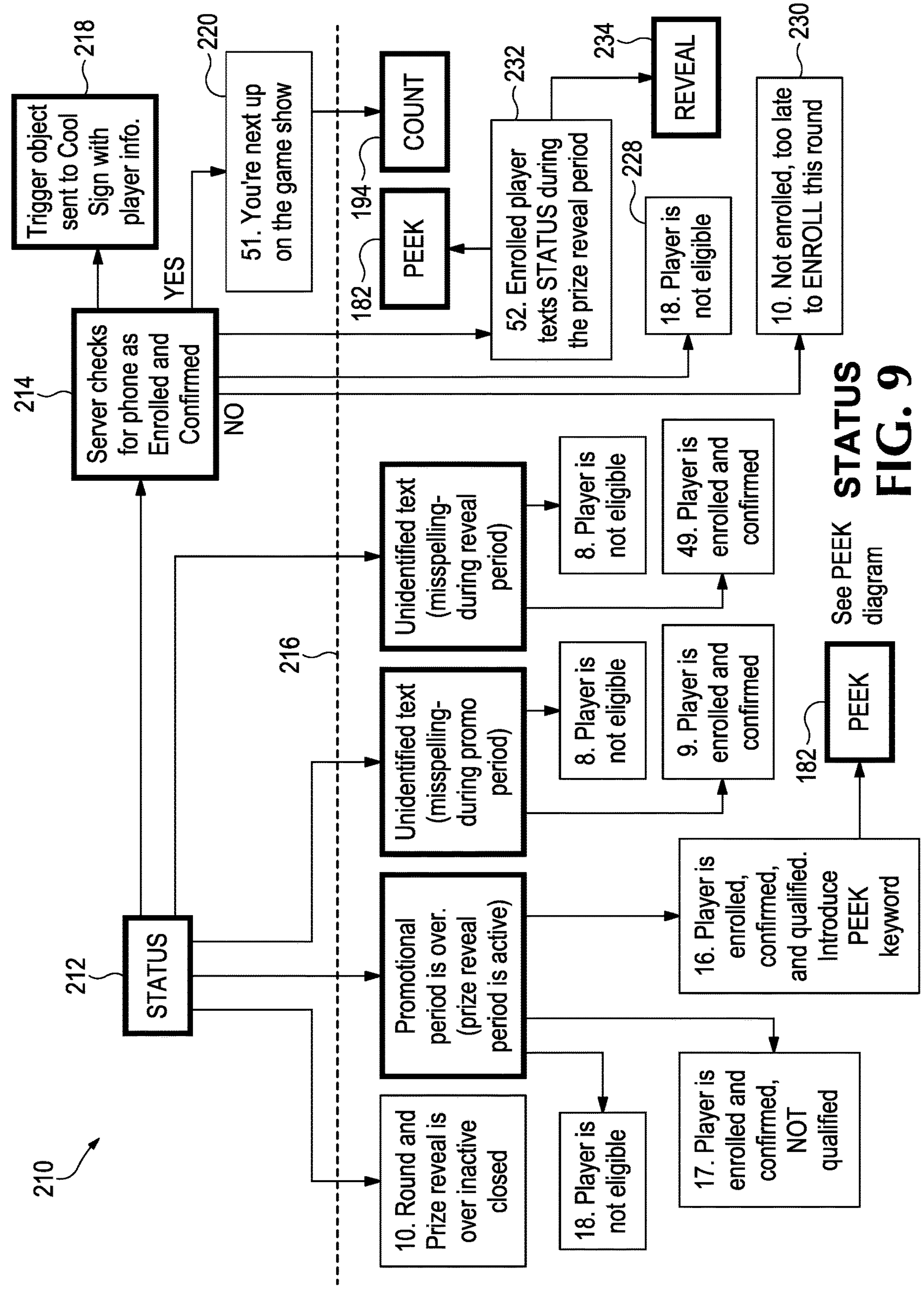

FIG. 9 shows a flow chart, indicated generally at 210 that depicts a process for informing the player of his or her position on the board and the number of accrued winvelopes. It does so via an animated video that appears on display 106 in FIG. 4 in response to a player texting the word STATUS in box 212. Unlike the text commands previously described, this command triggers a video animation that in the present implementation appears only on display 106. This could, however, be easily implemented to generate the animation on a website, e.g., in the player's online account with the casino. Although the player may trigger the animation wherever he or she is located, the display in the present implementation occurs only at the casino so it is desirable for players to text the STATUS command only when they are in position to observe the display.

The process in response to a player who texts STATUS during the reveal period (which immediately follows that play period) and who is determined to be enrolled and confirmed (in box 214) is illustrated above a dashed line 216. For such a player, system 92 retrieves data indicating their current position on the board and the number of accrued winvenlopes. This is sent to a digital controller (not shown) in box 218, which in turn is connected to display 106. In the present implementation, the digital controller is implemented using Bally Technologies CoolSign® digital signage software, but any suitable controller could be used. Data for different players is placed in a queue and the display for each player is shown in the order received.

Figure 10:
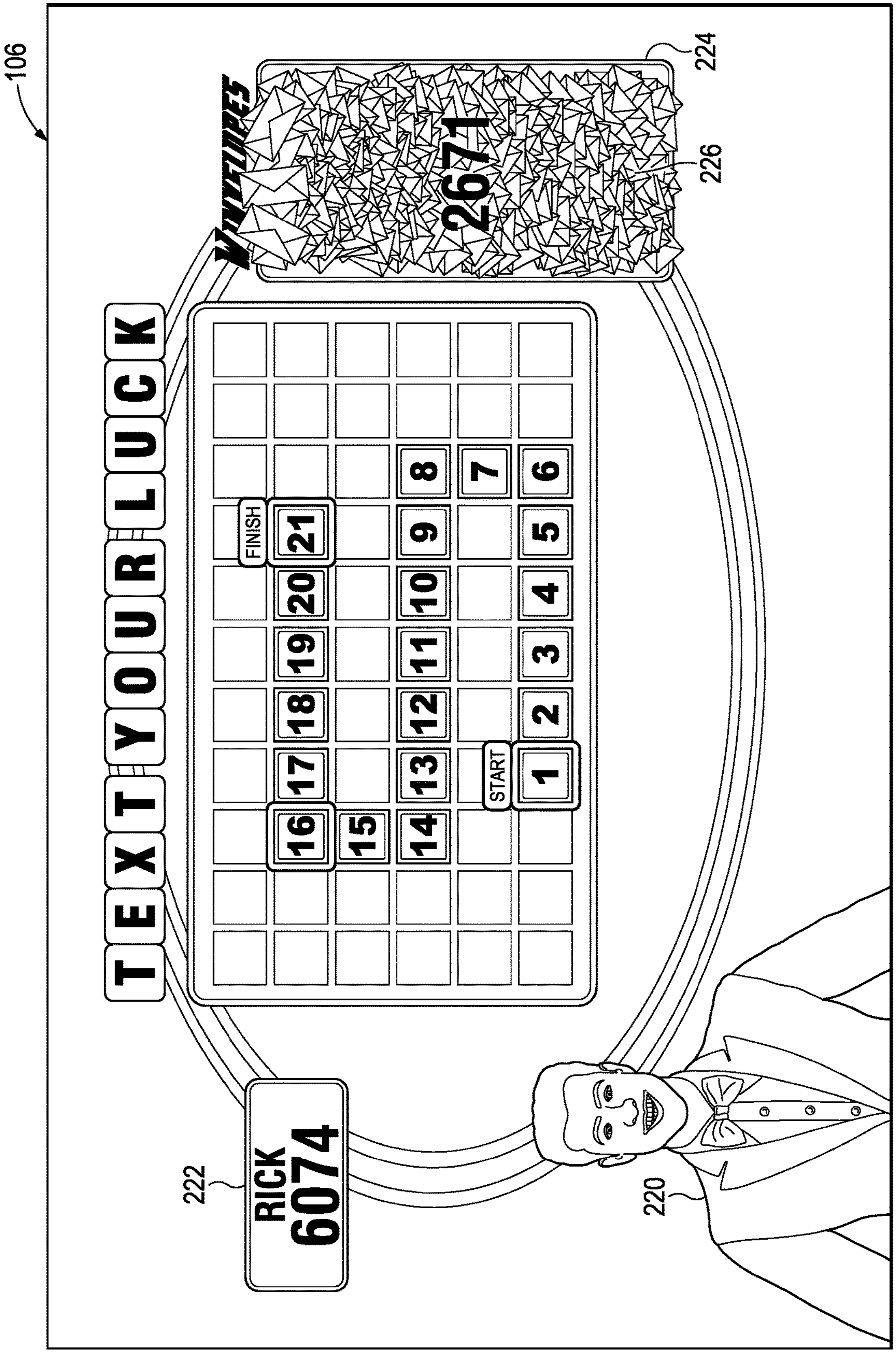
FIGS. 10 and 13-17 show screen shots taken from an animated display according to embodiments of the invention.

At the same time the player texts STATUS, message 51 in box 220 is sent to the player. This informs the player that they will be up soon on the display and that he or she can text COUNT to have their game board position and accrued winvelopes, texted as described in FIG. 8. A screen shot from the animation that appears on display 106 is shown in FIG. 10. Each player's information is depicted in an animated display that includes some standard portions for all players and some customized portions for the player whose status is displayed.

Wally 220, the virtual game show host, starts each sequence with the phrase 'Next up, the player with the phone number ending in______. Let's have a look at your status in the game." Wally speaks the blanks in the foregoing sentence as 6075. This confirms the identity of the player whose status is displayed without disclosing any confidential information. Wally can speak the numerals as a result of conventional text-to-speech software that recognizes data in each player's record and integrates it accordingly with prerecorded portions.

The system displays the player's first name, which is associated with their player record, and the last four digits of their phone number indicated at 222. Next, each square in the game board lights up in sequence from number 1 to the player's current location on the game board where the square is highlighted, like square number 16 in FIG. 10. Next, an animated container 224, which is empty at the start of each sequence, begins to fill with animated winvelopes 226 and the number of winvelopes, 2671 in the case of player Rick, appears superimposed over the container. Thereafter, Wally says: "Outstanding, make it to the finish line early and you'll earn twice the number of winvelopes for your slot play." Each of these sequences lasts about 20 seconds per player in this embodiment.

Consideration will now be given to the processes depicted below line 216 in FIG. 9. Most of that operates as previously explained in other flow charts with the exception of the rightmost portion. In boxes 228, 230 messages 18 and 10 are sent to a player who texts STATUS and who is not eligible or enrolled, respectively. In box 232, an enrolled and confirmed player who texts STATUS during the prize reveal period, i.e., after the play period and before the end of the prize reveal period, is so informed by message 52 and told to text PEEK 182 or REVEAL 234, which are described in FIGS. 11 and 12, respectively.

Figure 11:
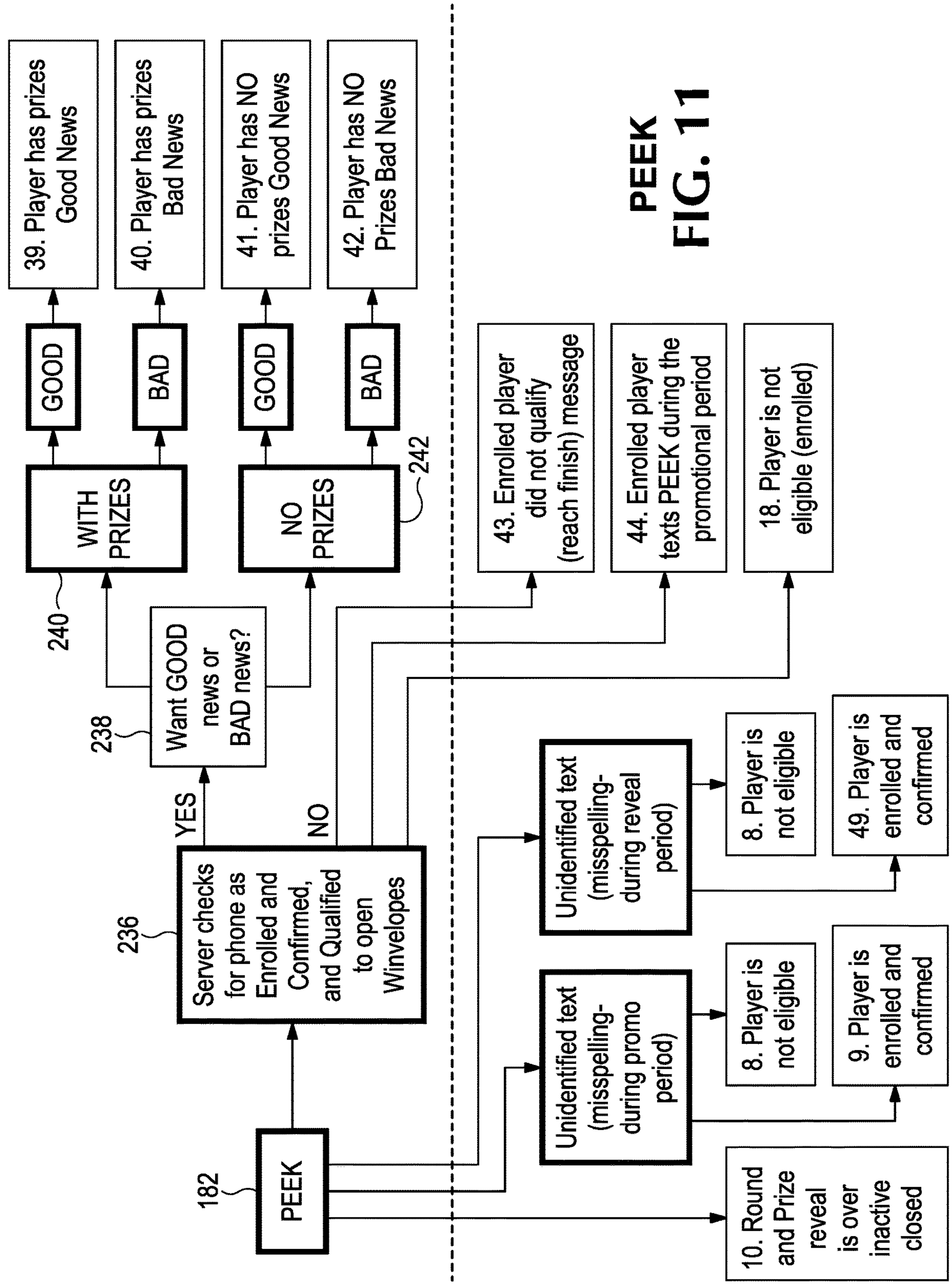

In FIG. 11, when system 92 receives a PEEK text in box 182, it first checks (in box 236) to confirm that the player associated with the phone number from which the text is received is enrolled, confirmed, and qualified to open winvelopes, i.e., has crossed the finish line. If yes, the system responds with the question: "Want GOOD news or BAD news?" in box 238. The system then checks to see if the any of the player's winvelopes are associated with prizes and determines whether the player has prizes, in box 240, or has no prizes, in box 242. The manner in which prizes are associated with winvelopes is described later. Those players with prizes who respond to the question with GOOD or BAD receive messages 39 or 40, respectively, and those without receive messages 41 or 42, respectively. Messages 39, 40 invite the player to the casino where the he or she can reveal the prizes on display 106 in a manner that will be described in connection with FIGS. 12-17. Messages 41, 42 encourage the player without prizes to play the next round. The boxes below the dashed line are similar to those previously described or are self-explanatory.

Figure 12:
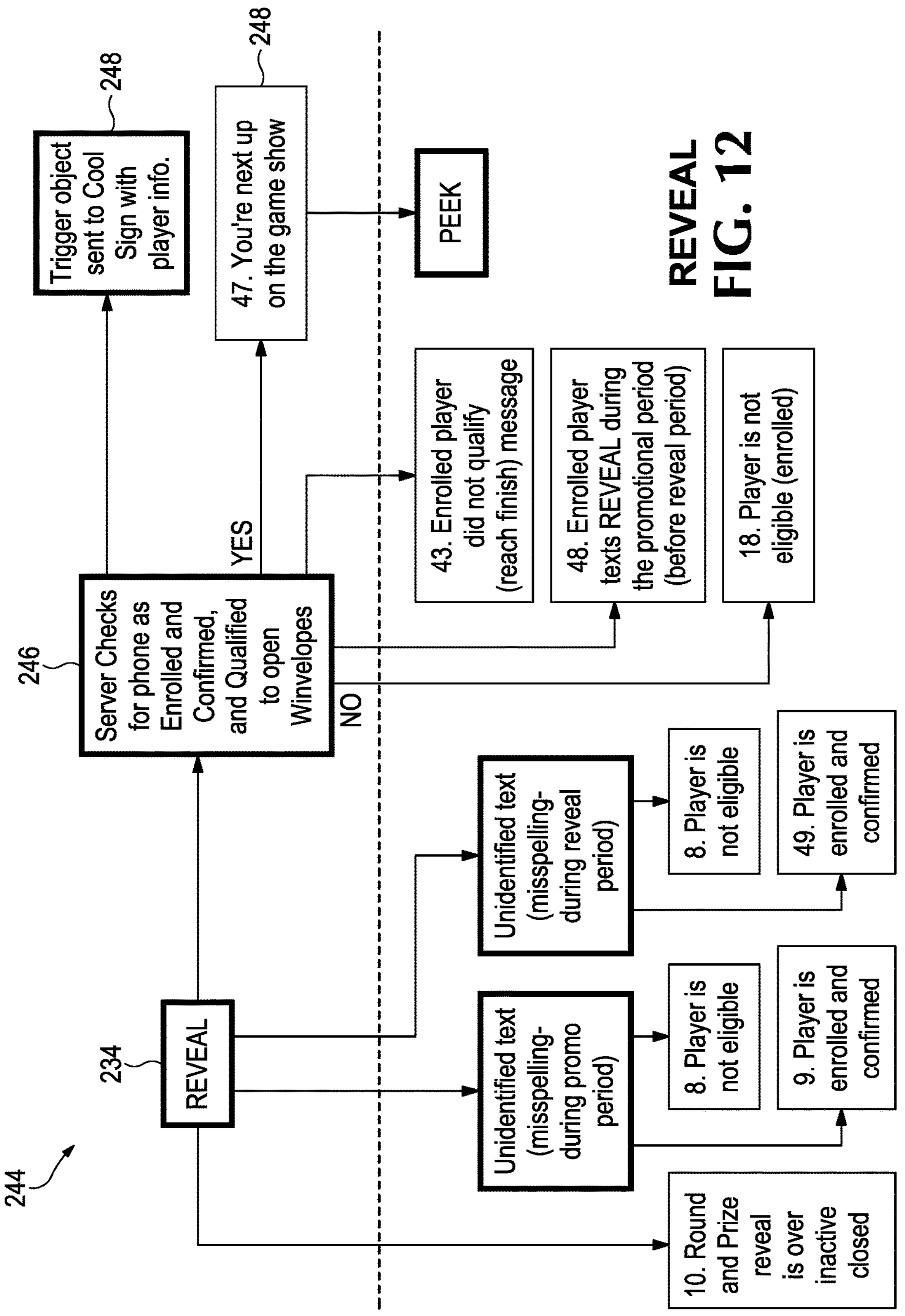

FIG. 12 shows a flow chart, indicated generally at 244, that depicts a process for informing an enrolled, confirmed, and qualified (by finishing the game) player of any prizes won. As with the STATUS command, it does so via an animated video that appears on display 106 in FIG. 4. Here it does so in response to a player texting the word REVEAL in box 234. This command triggers a video animation that in the present implementation appears only on display 106. This could, however, be easily implemented to generate the animation on a website, e.g., in the player's online account with the casino. Although the player may trigger the animation wherever he or she is located, the display in the present implementation occurs only at the casino so it is desirable for players to text the REVEAL command only when they are in position to observe the display.

When system 92 receives a REVEAL text in box 234, it first checks (in box 246) to confirm that the player associated with the phone number from which the text is received is enrolled, confirmed, and qualified to open winvelopes, i.e., has crossed the finish line. As with the STATUS command, data for different players is placed in a queue and the display for each player is shown in the order received.

At the same time the player texts REVEAL, message 47 in box 248 is sent to the player's phone. This informs the player that they will be up soon on the display and that he or she can text PEEK to find out if he or she has won anything as described in FIG. 11. The player is also advised to watch the screen to see what he or she has won. FIGS. 13-17 are sequential screen shots taken from the displayed animation that is triggered in response the REVEAL text.

Figure 13:
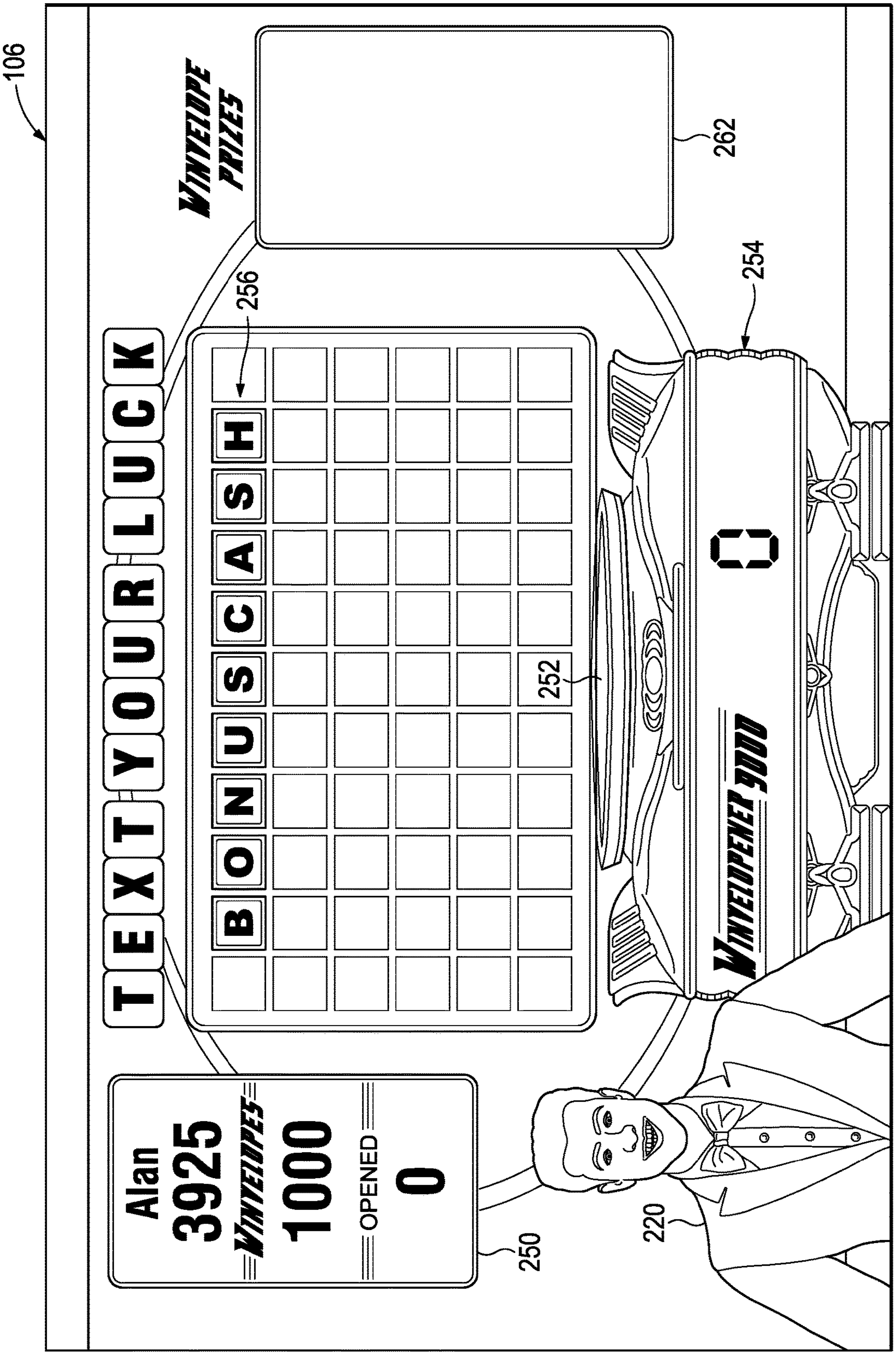

At the beginning of the REVEAL sequence, although not shown in the drawings, a curtain, in front of which Wally 220 stands, is drawn to reveal the screen depicted in FIG. 13. While the curtain is drawn, Wally announces that: "Another player is ready to open their winvelopes. Player with a phone number ending in 3925 take the center stage please. Now this is how it works folks. The Winvelopener 900 will quickly open all of the winvelopes. Some winvelopes may contain a prize and some winvelopes may contain a mystery letter. If you reveal all letters of the mystery word, you will unlock the mystery prize. Now let's get started." The 4-digit number is both announced by Wally and displayed in area 250 along with the player's first name.

Figure 14:
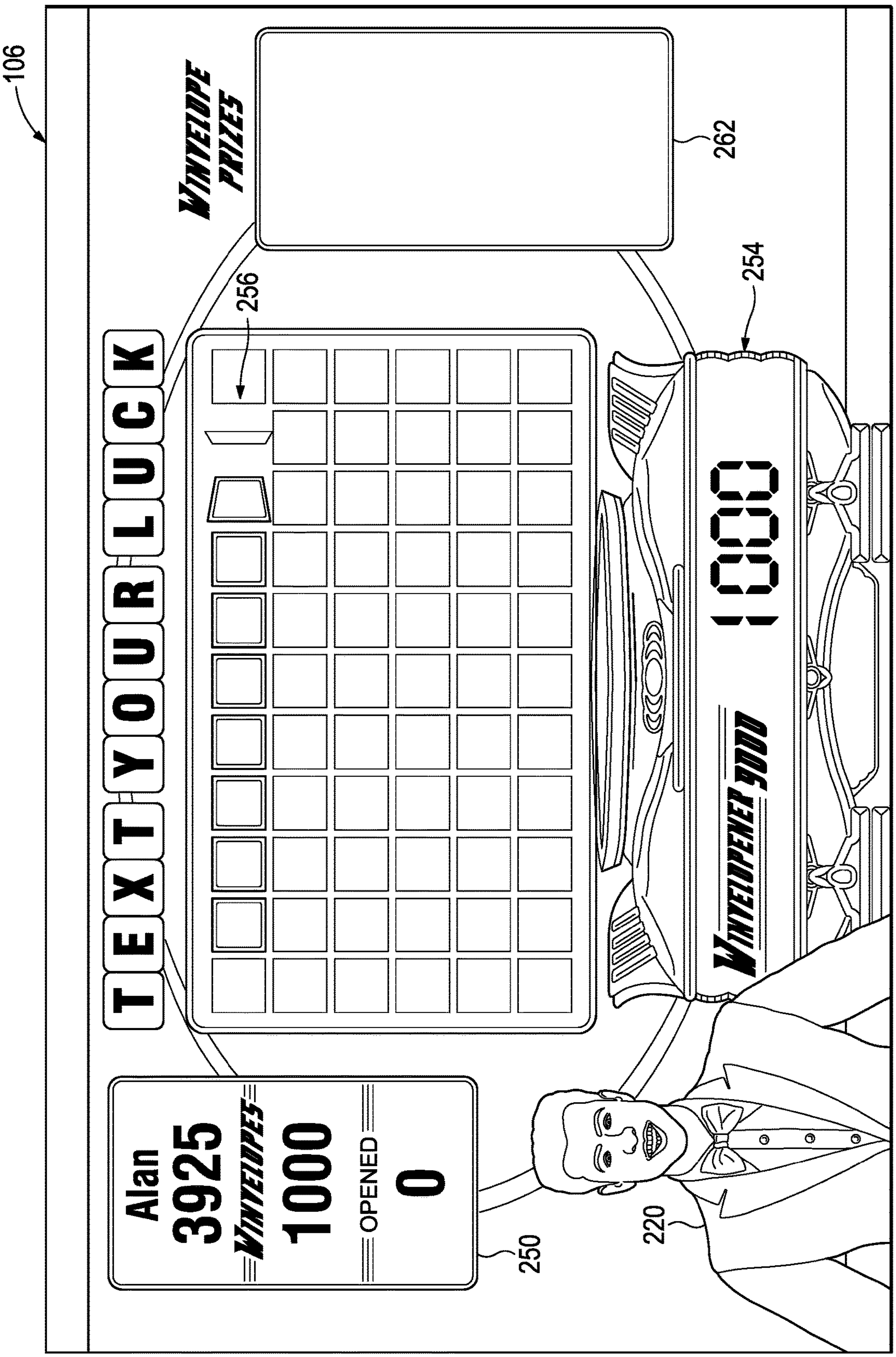

During this initial announcement by Wally, an animated depiction (not shown) of winvelopes drops from the top of the screen into the maw 252 of the Winvelopener 9000, a state-of-the art high-speed envelope opener 254. Immediately thereafter, the panels upon which the word Bonuscash appears, indicated generally at 256, all rotate to show blank spaces as shown in FIG. 14. The total number of winvelopes, 1000, is shown on area 250 and beneath that the total number opened, which currently stands at 0. As can be seen by comparing FIGS. 13 and 14, the number of winvelopes in Winvelopener 9000 has gone from 0, before they are dropped in, to 1000, the total number of winvelopes accrued by the player.

Figure 15:
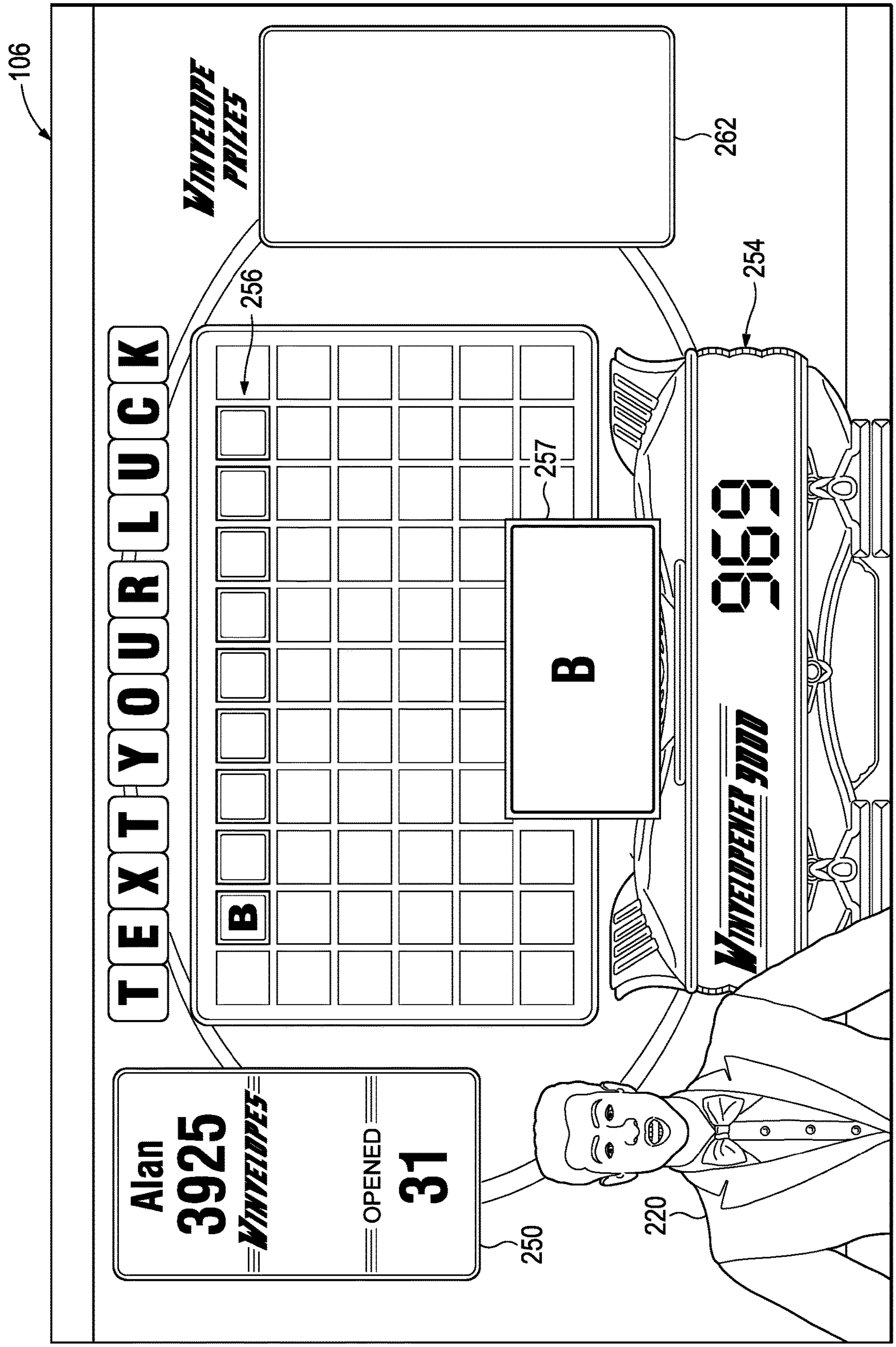

In FIG. 15, the number at the bottom of display begins to decrease as the Winvelopener 9000 "opens" each winvelope while the number opened in display 250 increases. This of course is a theatrical way of disclosing the prizes, all of which are stored on and known by system 92. The first prize, which was in the opened $31^{st}$ winvelope 257 is a mystery letter B, which takes its place on one of panels 256 as winvelope 257 appears above the Winvelopener 9000. Wally announces: "Another mystery prize letter!" It should be appreciated that winvelopes without prizes are opened rapidly, i.e., the number at the bottom of display 250 increments at a very rapid rate until a winvelope with a prize is encountered at which point incrementing stops while the prize is revealed.

Figure 16:
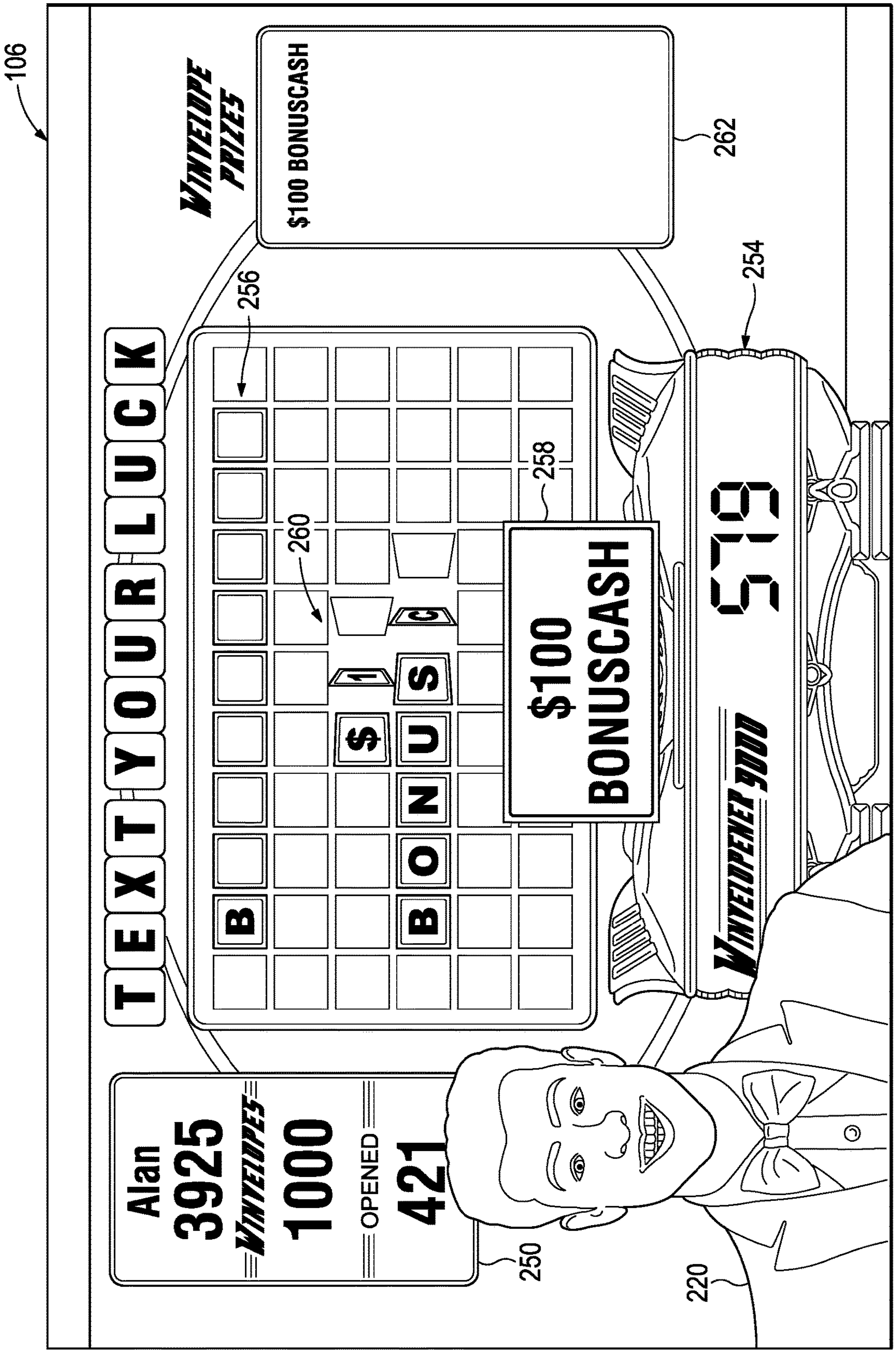
Figure 17:
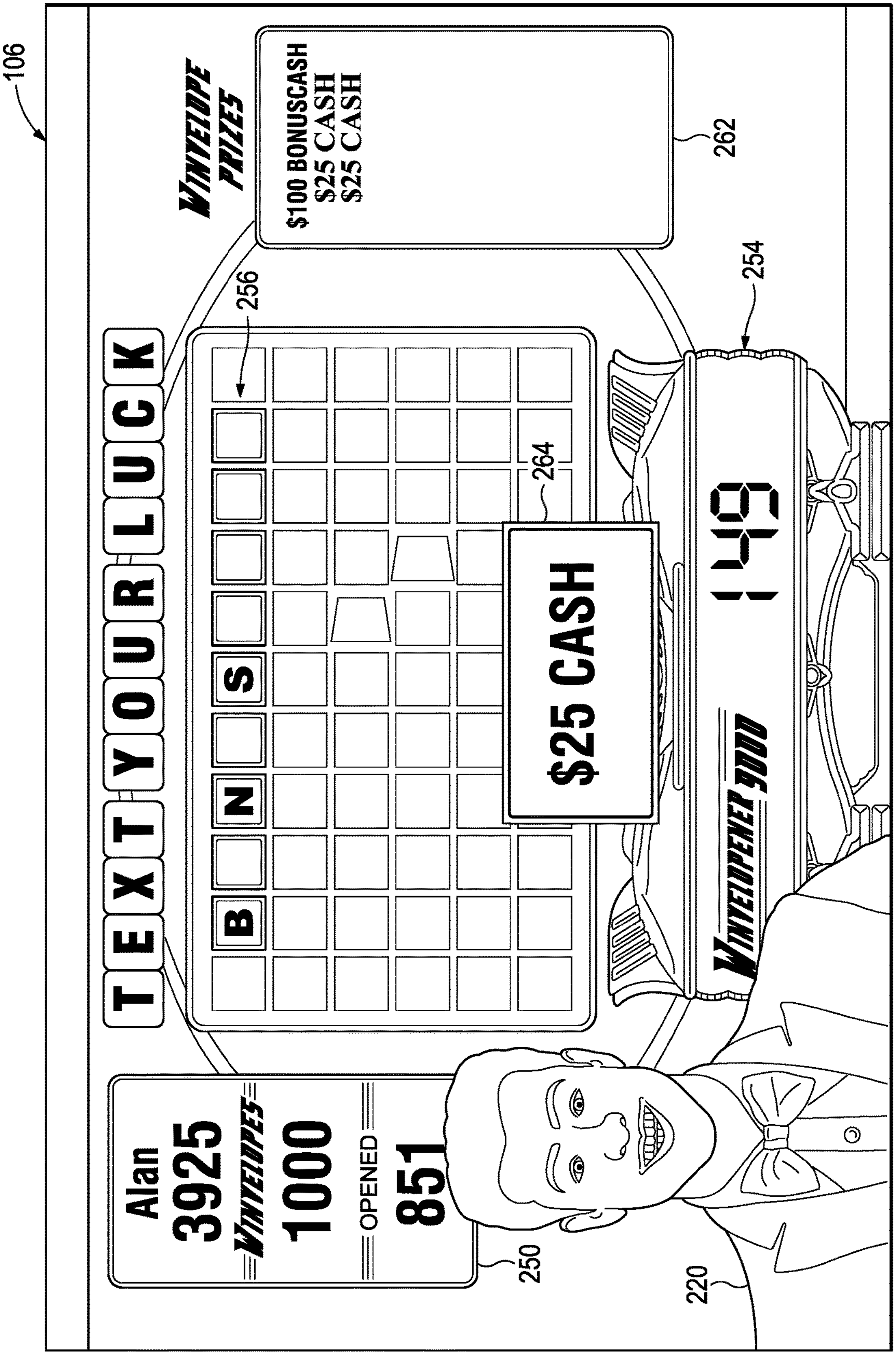

In FIG. 16, the $421^{st}$ opened winvelope 258 is shown to contain $100 of Bonuscash, which is revealed on winvelope 258 and spelled out on panels 260. It is also listed on a Winvelope Prizes display 262. Finally, in FIG. 17, after opening 850 winvelopes, additional mystery letters N and S have been revealed and placed on the display in animation not shown in the drawings. The $851^{st}$ winvelope 264 is for $25 cash. As can be seen a previously opened winvelope (not shown) also contained $25 cash, which is listed on display 262. After all the winvelopes are opened, if all of the mystery letters have filled in the word Bonuscash, the player wins a Mystery Prize. All prizes, cash, the Mystery Prize, and Bonuscash are collected at the players' club. After all winvelopes are opened, Wally announces: "That was the last winvelope. Congratulations to another Text Your Luck winner. Head on over to the players' club to collect your prizes. Thank you for playing Text Your Luck."

Consideration will now be given to some of the math that determines how prizes are awarded and how an awarded prize is revealed. As will be recalled, there are three types of prizes: cash, Bonuscash, and a Mystery Prize. All three types of prizes are awarded in the same fashion, namely by randomly associating each prize with a different winvelope in a deck of a predefined number of winvelopes. The size of the deck depends upon the anticipated number of participants and the estimated level at which each will gamble, which earns additional winvelopes. It is desirable to have a total number of winvelopes large enough so that they are not all distributed and another deck must be opened. This permits the casino to accurately budget for each period of promotional play because the cost of all possible prizes in the deck is known. Of course, not all of the prizes are necessarily awarded in a round. It is also desirable that the deck not be so large that the odds of winning a prize are very low. Those skilled in the art can set the total number of cards in the deck using players' club data. In addition, after running several promotions, player behavior in each promotion can be used to fine tune the total number of cards to meet the objectives of having enough in one deck for each promotion but not so many as to make the odds of winning unappealingly low.

An exemplary prize distribution could include a single top cash prize, e.g., $5,000, and more frequently awarded lesser amounts, e.g., 5 at $250, 50 at $100, etc. The same structure holds true for Bonuscash awards, which may be used like cash but only to play games in the Acme Casino. For example, there could be 25 prizes of $50 Bonuscash with each lower amount being more frequently awarded down to several thousand prizes of $5 Bonuscash. Finally, there could be a fixed number of Mystery Prizes, e.g., 50 each of which comprises a cash award of $100. The difference between an award of $100 cash and an award of a Mystery Prize is the manner in which each is revealed. As will be recalled, the cash and Bonuscash awards are disclosed to the player during the REVEAL sequence shown in FIGS. 13-17 and listed on Winvelope Prizes display 262. The Mystery Prize is won only when all of the letters in Bonuscash are drawn from the player's winvelopes and displayed on panels 256. Each player goes the player's club to redeem cash and Bonuscash awards, as does a player who has won a Mystery Prize. The player winning the mystery prize, however, does not know what the prize is until he or she redeems it at the players' club.

In general, a deck of winvelopes for distribution during play is created by starting with the prize table, which is the number of occurrences of each different prize that can be associated with each winvelope in the deck. So this embodiment would include the number of each amount of cash awards, each amount of bonus cash awards, the number of Mystery Prize awards, and the number of zero prizes. The sum of all of these equals the total number of winvelopes in the deck. Put differently, the prize table is a list of all possible prize types and amounts—including a loss where $0 is awarded—in the deck to be generated and the number of times each prize amount occurs in the deck. The total in the deck for a 21-day play period with an estimated 500 participants could be over a million cards.

To generate the deck, a different one of the prizes is randomly selected from the prize table and placed in the deck under construction. Each prize, including the losses, is placed in sequential order until all of the prizes are gone from the prize table. In other words, these selections are made without replacement. This generates a deck of winvelopes that are each associated with a prize type and/or amount, including losses.

There are a variety of known algorithms for randomly populating a deck with prizes. One that is used here comprises choosing a random number, N, from 0 to X-1, where X is the sum of the weights in the working distribution, which at the outset equals the total number of winvelopes in the deck. Next, loop through all the weights, and consider whether N is less than the current weight. If so, the prize associated with this weigh is chosen. If not, then advance to the next weight. Keep repeating, until N is less than the current weight. When that happens, chose the prize at that weight, save it in the current position, and deduct 1 from the weight in the working distribution. This process is repeated for each prize until the working distribution is empty. This process can be used to create a deck from which winvelopes are distributed in sequential order as players earn them or it can be dynamically implemented to generate winvelopes that are distributed when needed.

Now we consider the unique manner in which the mystery letters are selected and displayed. Of course for a player who received one of the winvelopes that indicated a Mystery Prize is won, all letters in the word Bonuscash will be displayed during the REVEAL sequence. But for those who did not receive a winvelope that designates a Mystery Prize winner, awarding some, but not all of the letters, may enhance the REVEAL sequence and create player anticipation and interest. As will be seen, it is desirable to award some players a "near win," which is defined as awarding the number of letters greater than or equal to half of the letters in the word (rounded down in the case that the number of letters in the word is not even as is the case with Bonuscash). So a near win for this promotion is 4 or more letters in the word Bonuscash. Code in system 92 considers 6 possible categories in determining the number of letters to allocate to a player who did not win the Mystery Prize. In doing so, the system takes into consideration the number of winvelopes held by a player as well as whether the player has won one of the cash or Bonuscash prizes.

First is a player who has the minimum number of winvelopes (11, one for enrolling and one for each move of a 10-day completion of the board) and has won a cash or Bonuscash prize but not a Mystery Prize. Here it is desirable to send the message that the player should have accrued more winvelopes. Since the player has already won a prize, the system allows for the possibility of the player not receiving any letters. And the player should not realize a near-win event. As a result, a random selection of the number of letters between 0 and 1 less than a near win is made, i.e., this player will be awarded from 0-3 letters.

Second is a player who has less than the average number of winvelopes and has won a cash or Bonuscash prize but not a Mystery Prize. The average number of winvelopes is determined by summing the winvelopes accrued by all qualified players, i.e., those finishing the game, divided by the number of such players. It is also desirable to encourage this player to accrue more winvelopes in future games. As a result, for this category of player, there is still a possibility that the player will not win even a single letter. On the other hand, a near miss is allowed, although not a significant probability that it will occur. To do so, the number of letters is determined by choosing from a uniform distribution over the number of letters in the word less than or equal to 1 less the total number of letters in the word, including zero letters. For the word Bonuscash, this rule results in choosing the number of letters in a uniform random selection over the range 0-8.

Third is the player who has greater than or equal to the average number of winvelopes and the player has won a prize. In this case, even though the player has won a prize, it is desirable to reward the player for the amount of play. In this category, every player will win at least one letter. But since they have won a prize, there will not be a significant probability of a near win event. To achieve these goals, the number of letters is determined by choosing from a uniform distribution over the number of letters in the word less than or equal to 1 less the total number of letters in the word, not including zero letters. For the word Bonuscash, this rule results in choosing the number of letters in a uniform random selection over the range 1-8.

Fourth is the player who has the minimum number of winvelopes and the player has not won a prize. In this case, it is desirable to encourage the player to come back while also sending the message that the player should have accumulated more winvelopes. To achieve these goals, there is a possibility that the player will not win any letters but a near win event is allowed. To do so, this category has the same outcome as the second case above, i.e., choosing the number of letters in a uniform random selection over the range 0-8.

Fifth is the player who has less than the average number of winvelopes and has not won a prize. In this case, even though the player has put some effort into his or her gaming/purchases, it is desirable to encourage the player to play more in the future. To achieve this goal, every player will win at least one letter and the possibility of achieving a near win event. To do so, the number of letters chosen is the same as the third case above, i.e., the number is chosen from a uniform distribution over the number of letters in the word less than or equal to 1 less the total number of letters in the word, not including zero letters. In this embodiment this range is from 1-8 letters.

Sixth is the player who has greater than or equal to the average number of winvelopes and has not won any prizes. This is the most interesting case and represents the player who should receive the largest encouragement. For this player the probability of a near win event is set at 60%. As a result, before selecting over a range of numbers to determine the number of letters, a first process determines whether or not this player will receive a near win event. This first process randomly selects a first number from a uniform distribution over the range of 0-9. If the selection is less than or equal to 3, this player will not receive a near win event. If greater than 3, the player will. The second process determines the number of letters by choosing from a uniform distribution over the number of letters in the word less than or equal to 1 less the total number of letters in the word, including zero letters, i.e., over the range 0-8. The second process is repeated as many times as necessary until the result corresponds to the outcome determined by the first process. For example, the first process results in a 2, which determines that the player should not receive a near win event, i.e., the player should receive 0-3 letters. But the first time the second process is run the outcome is 5 letters. The second process is repeated as many times as is necessary to produce a 0-3 letter outcome, which is what the player receives. Likewise, the first process may select a number in the range of 4-9, which determines that the outcome will be a near miss, i.e., 4-8 letters. If so, the second process is repeated as many times as is necessary to produce an outcome of 4-8 letters, which is awarded to the player.

Finally, we consider how each player's letters awarded, if any, according to the above processes are presented on display 106 during the REVEAL process described in FIGS. 12-17. Of course if the player is awarded 0 letters, nothing more need be done, and no letters appear on the display. But if any letters are awarded, the display sequence is set by first randomly shuffling all of the letters in the word Bonuscash using a typical shuffling algorithm. The first n letters of the randomly shuffled word are chosen, where n is the number of letters awarded to the player. Each winvelope has an index number associated with it. To associate each of the n letters with a winvelope, n winvelope indices are picked at random and each of the n letters in the order produced by the shuffle are associated with the next picked winvelope index.

This technique for displaying the letters has the effect of randomly distributing the revealed letters over all of the player's winvelopes, which makes for a more interesting REVEAL process as well as revealing each letter in a random order, which reduces predictability and also increases interest.

In other embodiments different approaches are used to determine winners and allocate drawing prize awards. These alternate embodiments will be explained with reference to a simplified example of a prize table and the manner in which those prizes are ultimately awarded to drawing participants.

First, a prize table is created, e.g., like that shown in Table 1 below.

TABLE 1

| QTY | Description |
|---|---|
| 1 | $5,000 cash |
| 2 | $1,000 cash |
| 3 | $100 cash |
| 5 | $25 cash |

Unlike the previously described prize table, Table 1 includes only winning entries and omits entries for zero prizes, i.e., no awards. Also, this simplified illustration depicts only cash awards, but it can be appreciated that Bonuscash awards and Mystery Prizes may be included in the table at their corresponding cash value and distributed in the same fashion. And there may be as many sizes of prizes and number of each as desired. This enables the casino to set a defined budget for each promotional game. In this embodiment, the players have to complete the REVEAL process described above and collect their prizes. As a result, the prize table defines a maximum expense for the promotional game assuming all players perform the necessary steps to collect their prizes. Any prizes not so collected remain with the casino and may be allocated to a future promotional game. In other embodiments, a winning player may be informed that he or she has won and then be given his or her prizes or otherwise informed about how to collect the prizes.

Next, the manner in which each player earns entries is defined. As will be recalled in the prior embodiment, each $2 wager earned a winvelope, i.e., one drawing entry. In the present example, we will consider that each $1 wager by a player during the promotion earns a corresponding winvelope, which corresponds to a drawing entry. It should be appreciated that these wagers may be made by the player with his or her own money or as wagers made with Bonuscash previously awarded to the player in a prior promotional game or in any manner that the casino may distribute Bonuscash. As a result, the casino may choose to award entries based only on wagers made with the player's own money, with Bonuscash, or with a combination. In addition, because the player tracking system logs the time that wagers are made and whether the wager is made with the player's cash or with Bonuscash, rules may be implemented that require playing—with player's cash, Bonuscash, or a combination—during defined times of the day, week, month, etc., to earn entries. The terms "player tracking" and "player tracking system" mean any technique by which a player's play may be associated with a particular player, whether identified by name or not. The purpose of distributing free play to players, which typically can only be played but not cashed out, is to induce additional play. As a result, all play during the promotional game, whether with the player's own money or with Bonuscash, accrues winvelopes in the promotional game. As in the previous example, the player may also earn winvelopes as a result of playing the promotional game. The number of winvelopes for each player is referred to herein as preliminary drawing entries.

The players are grouped according to the following Table 2.

TABLE 2

| Group | M | Description |
|---|---|---|
| A | 5 | Important players who don't need as much incentive |
| B | 20 | Players who could increase spend with incentives |
| C | 1 | Customers unlikely to respond to incentives |

The number in the M column in Table 2 represents a multiplier by which the player's winvelopes are multiplied before the drawing is conducted. This multiplied number is referred to herein as final drawing entries. As a result, the greater the multiplier, the more drawing entries the player has, as will be explained in more detail.

The players may be grouped in a variety of ways, including automatically based on demographic information or information in a player-tracking database. One way to group players is to do so manually at the casino when the player enrolls in the player's club, which tracks play by the players, or after they are so enrolled. This is typically done by a casino employee based on whatever information is available about the player. For example, it may be desirable, at least initially, to put players new to the players club in Group B to give them better odds of having an exciting, i.e., winning, experience with the promotional game. Studies have shown that the outcomes of a player's initial play in a casino can have a large bearing on whether that player is likely to return and play again. As time goes on and more data is collected via the player tracking system, the player's group may be altered.

Known players who are already playing at a high level on a regular basis do not necessarily need further incentive and may therefore be placed in Group A. Of course, as with new players, data over time may indicate a fall off of play, and it may be desirable to switch a player who was initially placed in Group A to Group B.

Finally, some players play very little and enter promotional contests with the hope of a big win that is not likely to be reinvested in further game play. These players are put into Group C. But as with any player, there may be indication over time, either through interaction with a casino employee or based on player-tracking data, that it might be desirable to move the player to one of the other groups.

In addition, there could be more or less than three groups and the players may be readily switched among the groups at the option of the casino. The players may be assigned to a group at any time, e.g., when they enroll or all the players may be each assigned a group as they enroll for the promotional game.

Once a player is assigned to a group, the group is indicated in the player's player-tracking record or another record that associates the player with a group for the purpose of the promotional game. And a player could also be changed to a different group at any time.

Next, cutoff values are defined for each group according to the following Table 3, for this example.

TABLE 3

| Group | Cutoff |
|---|---|
| A | $500 |
| B | $10,000 |
| C | $0 |

As will be more fully explained, once a player has won prizes in the promotional game that exceed the value in the cutoff table, they no longer benefit from the multiplier in Table 2. This tends to distribute the prizes more uniformly among the players and reduces the likelihood that any one player will receive an excessive reward. In this example, when a player in group A wins prizes totaling $500, they no longer receive the benefit of the multiplier in Table 2 for the remaining prize selections.

Consideration will now be given to how the prizes are assigned in this illustration. This occurs automatically under control of the system after the play period ends. In this embodiment, each prize is determined individually starting with the lowest value prizes. But in other embodiments, the prizes may be determined starting with the highest value prizes or they may be determined in any order desired by the casino. As will be shortly seen, starting with the highest value and working to the lowest value would mean that a winner of a high value prize would be less likely to win a low value prize. First, each player's final number of drawing entries is calculated by multiplying each player's winvelopes by their associated multiplier and then summing all of the players' final drawing entries. This total number of final drawing entries establishes a range from which a random number is selected. The following Table 4, which depicts the game table, establishes the conditions after the player period ends and before drawing for any prizes.

TABLE 4

| | | Winvelopes | | | | Prize | |
|---|---|---|---|---|---|---|---|
| Player | Group | Initial | Remain | M | Cutoff | Ttl | Entries |
| George | A | 50 | 50 | 5 | $500 | $0 | 250 |
| Mary | A | 80 | 80 | 5 | $500 | $0 | 400 |
| Tom | B | 30 | 30 | 20 | $10,000 | $0 | 600 |
| Debbie | B | 25 | 25 | 20 | $10,000 | $0 | 500 |
| Maggie | C | 10 | 10 | 1 | $0 | $0 | 10 |
| Brenda | C | 50 | 50 | 1 | $0 | $0 | 50 |
| Jim | C | 8 | 8 | 1 | $0 | $0 | 8 |
| | | | 253 | | | | 1818 |

As will be recalled, the lowest prizes, in this illustration the five $25 prizes, are awarded first. George is an important player (Group A) with a multiplier of 5. George earned 50 winvelopes as a result of his play during the play period, and all of his 50 winvelopes remain in the game table. The cutoff value for group A is $1,000 but George hasn't won anything, so the cutoff is not in effect. Therefore George has 50×5=250 final drawing entries in this drawing for the first $25 prize. Mary (also Group A) has 80 winvelopes and therefore has 80×5=400 final drawing entries.

Tom is a Group B player with a multiplier of 20. Although Tom has earned only 30 winvelopes, he gets 30×20=600 final drawing entries, more than either George or Mary, both of whom have more winvelopes. That is because management believes they can get more play from Tom if he wins a prize.

Similarly, all remaining players are given entries equal to the winvelope count multiplied by their group's multiplier value. Each entry is marked with the player's name and placed into an electronic bowl, from which one entry is randomly selected. All this happens in a few thousandths of a second.

The chances of a Group A player winning the prize is 650/1818, which is approximately 36%. The chances of a Group B player winning are 1080/1818, which is approximately 59%, and Group C players have only a 68/1818, approximately 3.7% chance to win. This matches the goal of awarding more prizes to Group B and few prizes to Group C, while still providing each player, regardless of group, a chance to win.

The winner of the first $25 prize is Debbie, from Group B. The game table now appears as shown in Table 5 below.

TABLE 5

| Player | Group | Winvelopes Initial | Winvelopes Remain | M | Cutoff | Prize Ttl | Entries |
|---|---|---|---|---|---|---|---|
| George | A | 50 | 50 | 5 | $500 | $0 | 250 |
| Mary | A | 80 | 80 | 5 | $500 | $0 | 400 |
| Tom | B | 30 | 30 | 20 | $10,000 | $0 | 600 |
| Debbie | B | 25 | 24 | 20 | $10,000 | $25 | 480 |
| Maggie | C | 10 | 10 | 1 | $0 | $0 | 10 |
| Brenda | C | 50 | 50 | 1 | $0 | $0 | 50 |
| Jim | C | 8 | 8 | 1 | $0 | $0 | 8 |
| | | | 252 | | | | 1798 |

Since one of Debbie's gems was used to earn a prize she only has 24 remaining winvelopes, with 480 entries. Debbie's chances of winning again are reduced but still quite good. Only 1,798 entries are in the bowl this time and George's name is drawn for the second $25 prize.

Now the game table looks as shown in Table 6 below.

TABLE 6

| Player | Group | Winvelopes Initial | Winvelopes Remain | M | Cutoff | Prize Ttl | Entries |
|---|---|---|---|---|---|---|---|
| George | A | 50 | 49 | 5 | $500 | $25 | 245 |
| Mary | A | 80 | 80 | 5 | $500 | $0 | 400 |
| Tom | B | 30 | 30 | 20 | $10,000 | $0 | 600 |
| Debbie | B | 25 | 24 | 20 | $10,000 | $25 | 480 |
| Maggie | C | 10 | 10 | 1 | $0 | $0 | 10 |
| Brenda | C | 50 | 50 | 1 | $0 | $0 | 50 |
| Jim | C | 8 | 8 | 1 | $0 | $0 | 8 |
| | | | 251 | | | | 1793 |

George now has one less winvelope remaining, resulting in fewer entries in the next round, for which total entries are now 1,793. Note that as each round progresses, the chances of a winner in a prior round winning again are reduced. Now imagine that all five $25 prizes have been awarded in the same fashion and all three $100 prizes have also been similarly awarded. It is now time to draw for the first $1,000 prize and the game table looks as shown in Table 7.

TABLE 7

| Player | Group | Winvelopes Initial | Winvelopes Remain | M | Cutoff | Prize Ttl | Entries |
|---|---|---|---|---|---|---|---|
| George | A | 50 | 48 | 5 | $500 | $125 | 240 |
| Mary | A | 80 | 79 | 5 | $500 | $25 | 395 |
| Tom | B | 30 | 28 | 20 | $10,000 | $125 | 560 |
| Debbie | B | 25 | 23 | 20 | $10,000 | $125 | 460 |
| Maggie | C | 10 | 10 | 1 | $0 | $0 | 10 |
| Brenda | C | 50 | 50 | 1 | $0 | $0 | 50 |
| Jim | C | 8 | 7 | 1 | $0 | $25 | 7 |
| | | | 245 | | | | 1722 |

As expected, Group B has done well. Tom got a $100 and a $25 prize, as did Debbie. Although he had lower odds of winning, George too has done well, also winning a $100 and $25 award. Jim in Group C really beat the odds by getting a $25 award but without the multiplier applied to Groups A and B, Group C players would have likely won considerably more.

Next up is the first $1,000 award, which is won by Mary, taking her total winnings to $1,025, which is above the Group A cutoff so her multiplier disappears, which is also referred to herein as changing the multiplier number to one. That means Mary has only 115$^{th}$ the chance to win than before the cutoff occurred. Table 8 shows the updated game table, after the first $1,000 award.

TABLE 8

| Player | Group | Winvelopes Initial | Winvelopes Remain | M | Cutoff | Prize Ttl | Entries |
|---|---|---|---|---|---|---|---|
| George | A | 50 | 48 | 5 | $500 | $125 | 240 |
| Mary | A | 80 | 77 | 1 | $500 | $1,125 | 77 |
| Tom | B | 30 | 28 | 20 | $10,000 | $125 | 560 |
| Debbie | B | 25 | 23 | 20 | $10,000 | $125 | 460 |
| Maggie | C | 10 | 10 | 1 | $0 | $0 | 10 |
| Brenda | C | 50 | 50 | 1 | $0 | $0 | 50 |
| Jim | C | 8 | 7 | 1 | $0 | $25 | 7 |
| | | | 244 | | | | 1404 |

Mary now has only 77 chances out of 1,404, giving her just under over a 5% chance to win another prize. The next $1,000 prize goes to Tom, taking him to total winnings of $1,125. Since the cutoff for Group B is $10,000 though, Tom's chances of winning the final $5,000 prize do not diminish.

Even so, it is Debbie that wins the grand prize, giving her a grand total of $5,125. As the final award schedule in Table 9 shows.

TABLE 9

| Player | Group | Prize Ttl |
|---|---|---|
| George | A | $125 |
| Mary | A | $1,125 |
| Tom | B | $125 |
| Debbie | B | $5,125 |
| Maggie | C | $0 |
| Brenda | C | $0 |
| Jim | C | $25 |
| | | $7,525 |

Consideration will now be given to the process for implementing one embodiment, in FIG. 18, and another embodiment in FIG. 19.

Figure 18A:
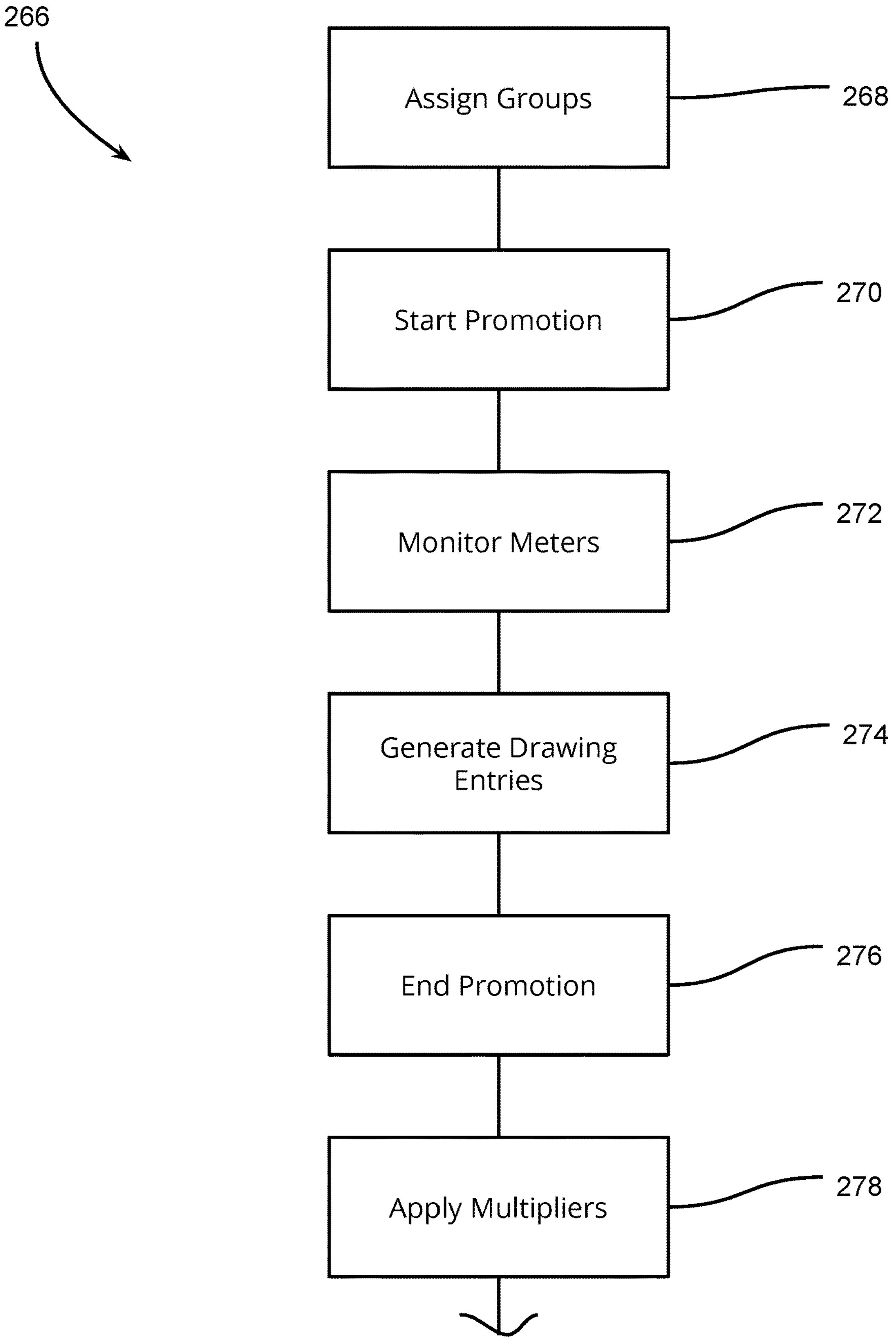
FIGS. 18A and 18B show a flow chart for an alternate embodiment.

A process is indicated generally at 266 in FIG. 18. The present process is implemented by computing devices and associated memories and databases that communicate with one another on the network depicted, among other places, in FIGS. 3 and 4. As is known in the art, these computing devices may be distributed among several different ones, including the player-tracking system, or consolidated in a single one. In FIG. 18A, at 268 the players are assigned to their respective groups. This may be done automatically as mentioned above, or manually, e.g., at the players' club booth. Continuing using the illustration described above, each player is assigned to one of groups A, B, or C.

At 270, the player period begins. During this time play on the gaming devices is monitored at 272. And corresponding preliminary drawing entries (the winvelopes) are generated at 274. The play period ends at 276. It should be appreciated that these actions may be performed in a different order. For example, all of the play could be tracked in the player tracking system and at the end of the play period that data could be extracted and used to then calculate the drawing entries. Or the drawing entries could be calculated and accrued in a database as they are generated as a result of play on the gaming devices, play of the promotional game, or by retail purchases.

After the promotion ends, any multipliers that are to be used for one or more groups are applied in 278. This generates Table 4, which is the game table before drawing for any prizes. Again, this action could be performed at the end of the play period or could be accomplished on the fly as winvelopes are generated.

Figure 18B:
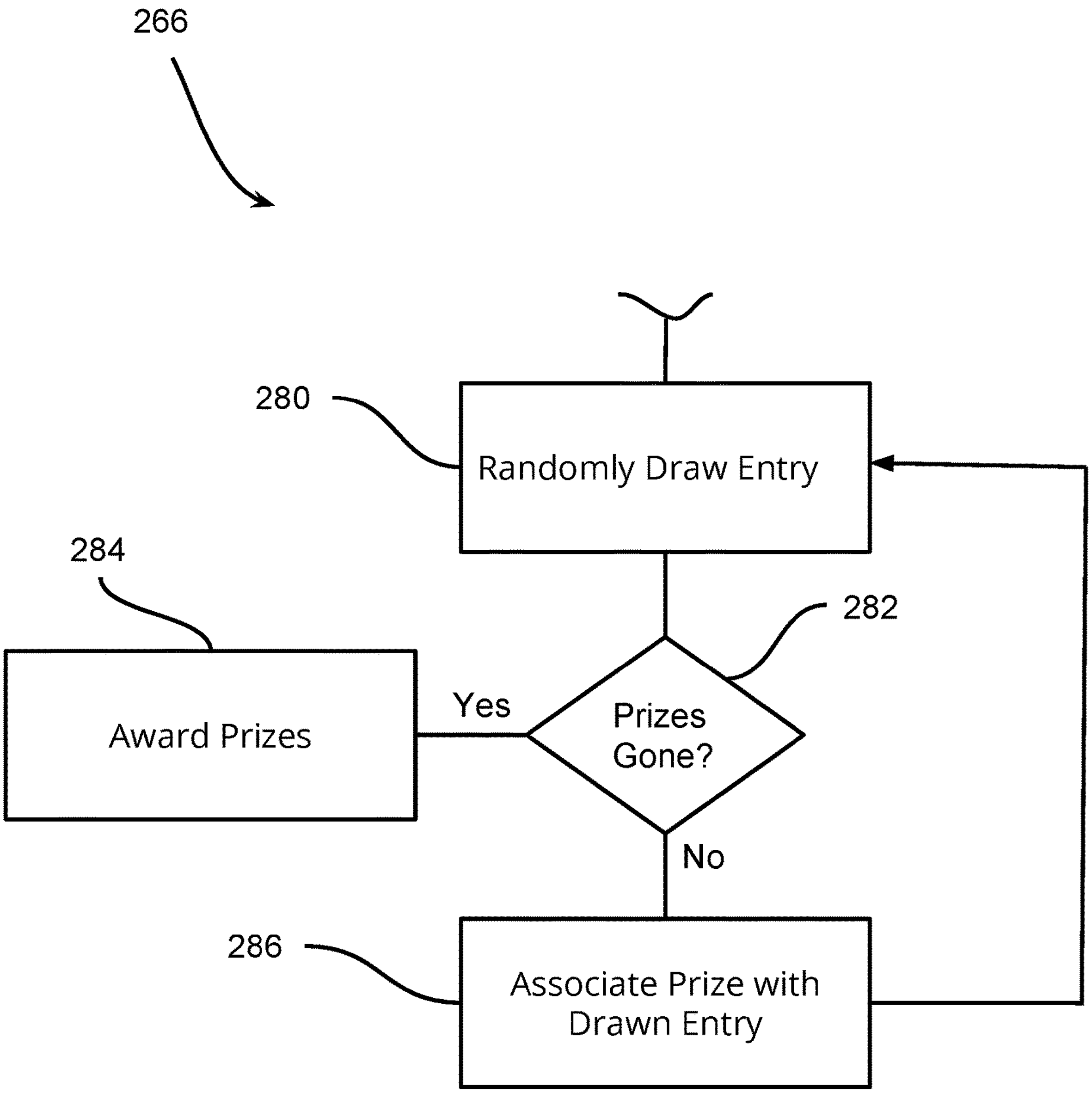

Thereafter, in FIG. 18B, a first entry is randomly drawn at 280. At 282, the process checks to see if all of the prizes from the prize table have been awarded. If they have, the prizes are awarded at 284 as described above. If not, at 286 the randomly drawn entry at 280 is associated with a prize from the prize table in Table 1. As will be recalled, in the present embodiment, the prizes are selected from the prize table in order from the lowest value to the highest, although a different order could be used in other embodiments. After drawing the first entry the game table appears as in Table 5.

After the first entry is drawn, the process loops back to 280, another entry is randomly drawn, and the game table is adjusted as described above. This process continues until it is determined that all of the prizes are awarded at 282 after which they are then awarded at 284.

Figure 19:
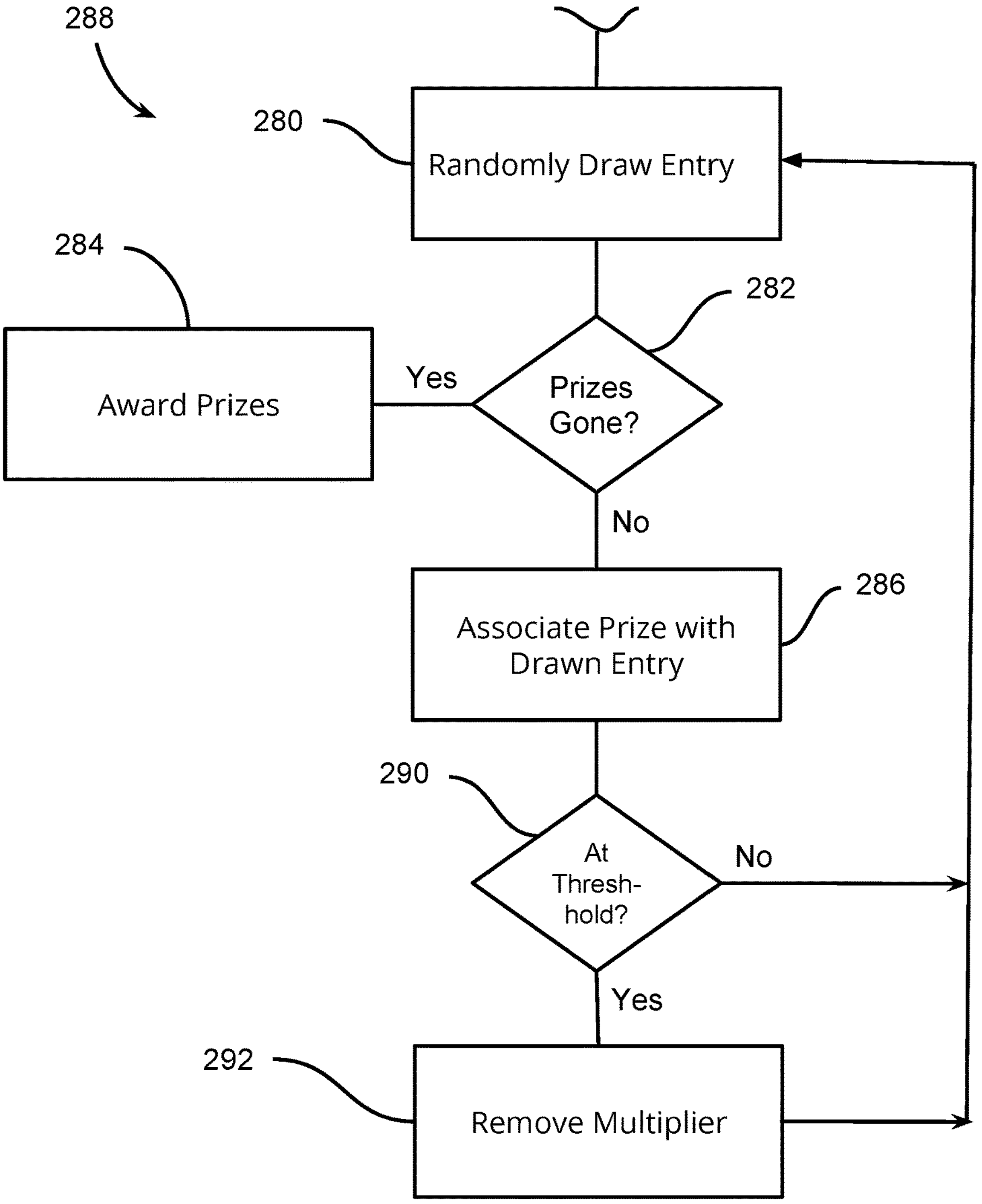
FIG. 19 is a flow chart for still another embodiment.

In FIG. 19, a process, indicated generally at 288, for implementing another embodiment is shown. Process actions that operate similarly to those previously described retain the same identifying numeral in FIG. 19. The process leading to 280 in FIG. 19 is substantially the same as that depicted in FIG. 18A. In other words, the embodiment described in FIG. 19 starts as shown in FIG. 18A and after 278 in FIG. 18A proceeds to 280 in FIG. 19.

Also, each of actions 280, 282, 284, and 286 operate in a similar fashion as previously described. But after 286, rather than looping back to 280 as in process 266, process 288 checks at 290 to determine whether or not the player whose entry was drawn in 280 and associated with a prize at 286 has reached the cutoff limit defined in Table 3. If not, the game table is adjusted as previously described, the process loops back to 280, and another entry is randomly drawn.

If, however, the process determines that the prize associated with the player entry in 286 puts that player over the cutoff limit, the process proceeds to 292. At 292, the multiplier for that player is removed as described in connection with Mary's win above where game table was adjusted as shown in FIG. 7.

The combination of player groups and multipliers, in one embodiment, and the addition of cutoff values in another embodiment provide casino management with the ability to direct prize awards to best stimulate what prizes are intended to do: increase play.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

What is claimed is:

1. A method comprising:

receiving, by a game server, during an enrollment period, from one or more user devices, one or more standard text-messaging protocol enrollment messages, wherein the one or more standard text-messaging protocol enrollment messages are configured to enroll the one or more user devices in a game;

determining, based on the one or more standard text-messaging protocol enrollment messages, one or more gaming parameters associated with the game;

receiving, from the one or more user devices, one or more standard text-messaging protocol play messages configured to advance play of the game;

associating, based on the one or more gaming parameters and the one or more standard text-messaging protocol play messages, the one or more user devices with one or more outcomes;

receiving, from an electronic casino gaming device in a casino, an indication that a user associated with a user device of the one or more user devices is in the casino; and causing, based on the indication, a display device in the casino to display an outcome of the one or more outcomes.

2. The method of claim 1, wherein the one or more standard text-messaging protocol enrollment messages comprise one or more identifiers associated with the one or more user devices.

3. The method of claim 1, wherein the game comprises a wagering game.

4. The method of claim 1, wherein the one or more gaming parameters comprise one or more of: one or more paytables, one or more game board configurations, one or more wagering protocols, or one or more bonuses.

5. The method of claim 1, wherein the indication is received from a player tracking unit of the electronic casino gaming device.

6. The method of claim 1, wherein the one or more outcomes comprise one or more winning outcomes or one or more losing outcomes.

7. The method of claim 1, further comprising, determining, based on a user device identifier associated with the user device, a player account.

8. The method of claim 1, wherein the one or more standard text-messaging protocol enrollment messages and the one or more standard text-messaging protocol play messages comprise one or more short messaging service (SMS) messages.

9. An electronic casino gaming apparatus comprising:

one or more processors; and memory storing processor executable instructions that, when executed by the one or more processors, cause the electronic casino gaming apparatus to:

receive, during an enrollment period, from one or more user devices, one or more standard text-messaging protocol enrollment messages, wherein the one or more standard text-messaging protocol enrollment messages are configured to enroll the one or more user devices in a game;

determine, based on the one or more standard text-messaging protocol enrollment messages, one or more gaming parameters associated with the game;

receive, from the one or more user devices, one or more standard text-messaging protocol play messages configured to advance play of the game;

associate, based on the one or more gaming parameters and the one or more standard text-messaging protocol play messages, the one or more user devices with one or more outcomes;

receive, from an electronic casino gaming device in a casino, an indication that a user associated with a user device of the one or more user devices is in the casino; and cause, based on the indication, a display device in the casino to display an outcome of the one or more outcomes.

10. The electronic casino gaming apparatus of claim 9, wherein the one or more standard text-messaging protocol enrollment messages comprise one or more identifiers associated with the one or more user devices.

11. The electronic casino gaming apparatus of claim 9, wherein the game comprises a wagering game.

12. The electronic casino gaming apparatus of claim 9, wherein the one or more gaming parameters comprise one or more of: one or more paytables, one or more game board configurations, one or more wagering protocols, or one or more bonuses.

13. The electronic casino gaming apparatus of claim 9, wherein the indication is received from a player tracking unit of the electronic casino gaming device.

14. The electronic casino gaming apparatus of claim 9, wherein the one or more outcomes comprise one or more winning outcomes or one or more losing outcomes.

15. The electronic casino gaming apparatus of claim 9, wherein the processor executable instructions, when executed by the one or more processors, further cause the electronic casino gaming apparatus to determine, based on a user device identifier associated with the user device, a player account.

16. The electronic casino gaming apparatus of claim 9, wherein the one or more standard text-messaging protocol enrollment messages and the one or more standard text-messaging protocol play messages comprise one or more short messaging service (SMS) messages.

17. One or more non-transitory computer-readable media, storing processor-executable instructions thereon that, when executed by a processor, cause the processor to:

receive, by a gaming server, during an enrollment period, from one or more user devices, one or more standard text-messaging protocol enrollment messages, wherein the one or more standard text-messaging protocol enrollment messages are configured to enroll the one or more user devices in a game;

determine, based on the one or more standard text-messaging protocol enrollment messages, one or more gaming parameters associated with the game;

receive, from the one or more user devices, one or more standard text-messaging protocol play messages configured to advance play of the game;

associate, based on the one or more gaming parameters and the one or more standard text-messaging protocol play messages, the one or more user devices with one or more outcomes;

receive, from an electronic casino gaming device in a casino, an indication that a user associated with a user device of the one or more user devices is proximate the electronic casino gaming device; and cause, based on the indication, a display device in the casino to display an outcome of the one or more outcomes.

18. The one or more non-transitory computer-readable media of claim 17, wherein the one or more standard text-messaging protocol enrollment messages comprise one or more identifiers associated with the one or more user devices.

19. The one or more non-transitory computer-readable media of claim 17, wherein the game comprises a wagering game.

20. The one or more non-transitory computer-readable media of claim 17, wherein the one or more gaming parameters comprise one or more of: one or more paytables, one or more game board configurations, one or more wagering protocols, or one or more bonuses.

21. The one or more non-transitory computer-readable media of claim 17, wherein the indication is received from a player tracking unit of the electronic casino gaming device.

22. The one or more non-transitory computer-readable media of claim 17, wherein the processor-executable instructions, when executed by the processor, further cause the processor to determine, based on a user device identifier associated with the a user device, a player account.

23. The one or more non-transitory computer-readable media of claim 17, wherein the one or more standard text-messaging protocol enrollment messages and the one or more standard text-messaging protocol play messages comprise one or more short messaging service (SMS) messages.

* * * * *